(12) United States Patent
Kasada et al.

(10) Patent No.: US 11,495,246 B2
(45) Date of Patent: Nov. 8, 2022

(54) MAGNETIC TAPE CARTRIDGE AND MAGNETIC TAPE APPARATUS

(71) Applicant: FUJIFILM Corporation, Tokyo (JP)

(72) Inventors: Norihito Kasada, Minami-ashigara (JP); Yosuke Sumiya, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/160,534

(22) Filed: Jan. 28, 2021

(65) Prior Publication Data
US 2021/0241786 A1    Aug. 5, 2021

(30) Foreign Application Priority Data
Jan. 31, 2020 (JP) .............................. JP2020-015558

(51) Int. Cl.
*G11B 5/008* (2006.01)
*G11B 5/706* (2006.01)

(52) U.S. Cl.
CPC ...... *G11B 5/00813* (2013.01); *G11B 5/70678* (2013.01)

(58) Field of Classification Search
None
See application file for complete search history.

(56) References Cited

U.S. PATENT DOCUMENTS

| 3,953,657 | A | * | 4/1976 | Yamaguchi | ......... | C04B 20/1033 |
| | | | | | | 428/406 |
| 5,405,648 | A | * | 4/1995 | Hermann | ................. | B01J 2/006 |
| | | | | | | 427/213.31 |
| 2006/0032146 | A1 | * | 2/2006 | Partch | ................... | C09K 3/1436 |
| | | | | | | 51/298 |
| 2008/0265078 | A1 | * | 10/2008 | Shiga | .................... | G11B 23/107 |
| | | | | | | 242/348.3 |
| 2011/0204027 | A1 | * | 8/2011 | Moriya | ...................... | G03F 1/24 |
| | | | | | | 216/53 |
| 2012/0045664 | A1 | | 2/2012 | Tanaka et al. | | |
| 2013/0284842 | A1 | * | 10/2013 | Moses | .................. | G11B 23/037 |
| | | | | | | 242/160.4 |

(Continued)

FOREIGN PATENT DOCUMENTS

| JP | 2012-043495 A | | 3/2012 | | |
| JP | 2016126817 A | * | 7/2016 | ............... | G11B 5/71 |
| JP | 2017111842 A | * | 6/2017 | ............... | G11B 5/70 |

*Primary Examiner* — William J Klimowicz
(74) *Attorney, Agent, or Firm* — Sughrue Mion, PLLC

(57) ABSTRACT

The magnetic tape cartridge includes a magnetic tape that is accommodated in the magnetic tape cartridge while being wound around a reel hub. The magnetic tape has a non-magnetic support and a magnetic layer including ferromagnetic powder, and includes one or more components selected from the group consisting of a fatty acid and a fatty acid amide in a portion on the magnetic layer side on the non-magnetic support, and after the magnetic tape cartridge is stored in an environment of an atmosphere temperature of 60° C. and a relative humidity of 80% for 24 hours, a C—H derived C concentration calculated from a C—H peak area ratio of C1s spectra obtained by X-ray photoelectron spectroscopic analysis performed at a photoelectron take-off angle of 10 degrees on a surface of the magnetic layer in an inner region during winding of the magnetic tape is 45 at % or more.

19 Claims, 3 Drawing Sheets

(56) References Cited

U.S. PATENT DOCUMENTS

| | | | | |
|---|---|---|---|---|
| 2014/0212693 A1* | 7/2014 | Hattori | .................. | G11B 5/733 |
| | | | | 428/832 |
| 2016/0189739 A1* | 6/2016 | Kasada | ................ | G11B 5/7334 |
| | | | | 428/840 |
| 2016/0189740 A1* | 6/2016 | Oyanagi | ................ | G11B 5/733 |
| | | | | 427/127 |
| 2017/0032812 A1* | 2/2017 | Kasada | .................... | G11B 5/71 |
| 2017/0178676 A1* | 6/2017 | Kasada | ................ | G11B 5/7013 |
| 2017/0372738 A1* | 12/2017 | Kasada | .................... | G11B 5/71 |
| 2018/0286450 A1* | 10/2018 | Kasada | .............. | G11B 5/70678 |
| 2018/0286453 A1* | 10/2018 | Kasada | ................ | G11B 5/3909 |

\* cited by examiner

MAGNETIC TAPE CARTRIDGE AND MAGNETIC TAPE APPARATUS

CROSS-REFERENCE TO RELATED APPLICATIONS

This application claims priority under 35 U.S.C 119 to Japanese Patent Application No. 2020-015558 filed on Jan. 31, 2020. The above application is hereby expressly incorporated by reference, in its entirety, into the present application.

BACKGROUND OF THE INVENTION

1. Field of the Invention

The present invention relates to a magnetic tape cartridge and a magnetic tape apparatus.

2. Description of the Related Art

There are two types of magnetic recording media: a tape shape and a disk shape, and a tape-shaped magnetic recording medium, that is, a magnetic tape is mainly used for data storage applications (see, for example, JP2012-043495A).

SUMMARY OF THE INVENTION

Reproduction of data recorded on a magnetic tape is usually performed as follows. A magnetic tape cartridge in which the magnetic tape is accommodated is set in a magnetic tape apparatus called a drive. Thereafter, while the magnetic tape runs in the magnetic tape apparatus, a magnetic layer surface of the magnetic tape and a magnetic head are brought into contact with each other to be slid on each other, and the data recorded on the magnetic layer is read by the magnetic head and the data is reproduced. However, in a case where the magnetic tape is inferior in running stability, the reproduction output is reduced due to off-track. Therefore, it is desired that the magnetic tape has excellent running stability.

Data recorded on various recording media such as the magnetic tape is called hot data, warm data, or cold data depending on an access frequency (reproduction frequency). The access frequency decreases in the order of hot data, warm data, and cold data, and recording and long-term storage of data with a low access frequency (for example, cold data) is called archiving (archive). With dramatic increase in the amount of information and digitization of various kinds of information in recent years, the amount of data recorded and stored in the recording medium for archiving increases, and therefore, attention is paid to a recording and reproducing system suitable for archiving.

The magnetic tape is usually accommodated in a magnetic tape cartridge in a state of being wound around a reel hub. Therefore, long-term storage of the magnetic tape after the data with a low access frequency is recorded is usually performed in a state where the magnetic tape is accommodated in the magnetic tape cartridge.

The present inventor has conducted studies regarding the above point, and it has been clear that, in a case where the data recorded on the magnetic tape is reproduced after long-term storage of the magnetic tape is performed as described above in a state of being accommodated in the magnetic tape cartridge, running stability tends to be low in a region of the magnetic tape wound near the reel hub during winding (hereinafter, referred to as a "cartridge core side").

An aspect of the present invention is to provide means for improving running stability on a cartridge core side of a magnetic tape after long-term storage.

An aspect of the present invention relates to a magnetic tape cartridge comprising:

a magnetic tape that is accommodated in the magnetic tape cartridge while being wound around a reel hub, in which the magnetic tape has a non-magnetic support and a magnetic layer including ferromagnetic powder, and includes one or more components selected from the group consisting of a fatty acid and a fatty acid amide in a portion on the magnetic layer side on the non-magnetic support, and after the magnetic tape cartridge is stored in an environment of an atmosphere temperature of 60° C. and a relative humidity of 80% for 24 hours, a C—H derived C concentration (hereinafter, also referred to as a "C—H derived C concentration after storage" or a "C—H derived C concentration") calculated from a C—H peak area ratio of C1s spectra obtained by X-ray photoelectron spectroscopic analysis performed at a photoelectron take-off angle of 10 degrees on a surface of the magnetic layer in an inner region during winding of the magnetic tape is 45 at % or more. Regarding the unit, 1 atm=101325 Pa (Pascal)=101325 N (Newton)/m².

In one embodiment, the C—H derived C concentration may be 45 at % or more and 80 at % or less.

In one embodiment, the magnetic layer may include inorganic oxide-based particle.

In one embodiment, the inorganic oxide-based particle may be a composite particle of an inorganic oxide and a polymer.

In one embodiment, a material constituting at least an outer peripheral surface layer portion of the reel hub may have a flexural modulus of 5 GPa or more.

In one embodiment, the flexural modulus may be 8 GPa or more.

In one embodiment, the magnetic tape may have a non-magnetic layer including non-magnetic powder between the non-magnetic support and the magnetic layer.

In one embodiment, the magnetic tape may have a back coating layer including non-magnetic powder on a surface side of the non-magnetic support opposite to a surface side provided with the magnetic layer.

In one embodiment, the ferromagnetic powder may be hexagonal barium ferrite powder.

In one embodiment, the ferromagnetic powder may be hexagonal strontium ferrite powder.

In one embodiment, the ferromagnetic powder may be ε-iron oxide powder.

Another aspect of the present invention relates to a magnetic tape apparatus comprising the magnetic tape cartridge.

According to one aspect of the present invention, it is possible to provide a magnetic tape cartridge in which a magnetic tape is accommodated and which has excellent running stability on a cartridge core side in a case where the magnetic tape runs in a magnetic tape apparatus after long-term storage. In addition, according to one aspect of the present invention, it is possible to provide a magnetic tape apparatus including such a magnetic tape cartridge.

DESCRIPTION OF THE PREFERRED EMBODIMENTS

Magnetic Tape Cartridge

Figure 1:
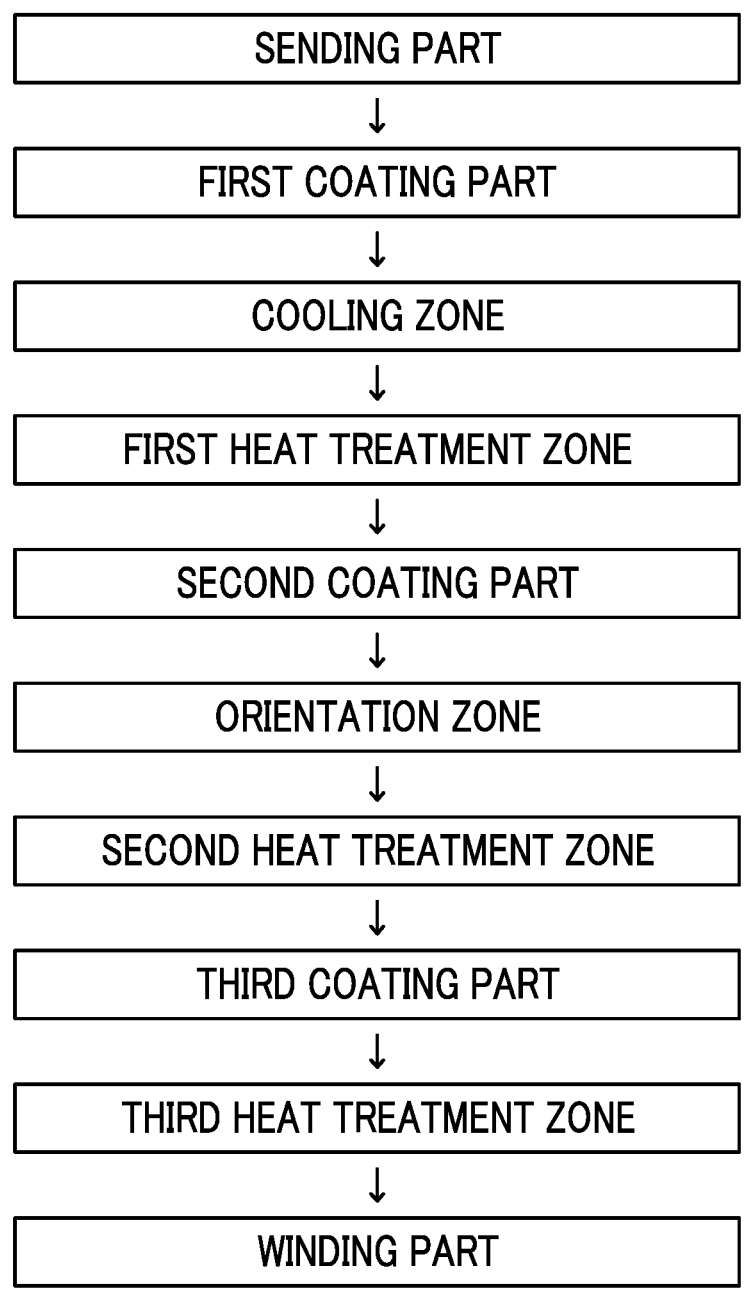
FIG. 1 shows an example (schematic process diagram) of a manufacturing process of a magnetic tape.

An aspect of the present invention relates to a magnetic tape cartridge in which a magnetic tape is accommodated while being wound around a reel hub. The magnetic tape has a non-magnetic support and a magnetic layer including ferromagnetic powder, and includes one or more components selected from the group consisting of a fatty acid and a fatty acid amide in a portion on the magnetic layer side on the non-magnetic support. After the magnetic tape cartridge is stored in an environment of an atmosphere temperature of 60° C. and a relative humidity of 80% for 24 hours, a C—H derived C concentration calculated from a C—H peak area ratio of C1s spectra obtained by X-ray photoelectron spectroscopic analysis performed at a photoelectron take-off angle of 10 degrees on a surface of the magnetic layer in an inner region during winding of the magnetic tape is 45 at % or more.

In the magnetic tape, in a case where an end portion which is a starting point of winding during winding of the magnetic tape around the reel hub is called a tape inner end, a "region from the tape inner end to a length of 50 m in a longitudinal direction (length: 50 m)" is an "inner region during winding" in the present invention and the present specification. In the present invention and the present specification, such an inner region during winding is adopted as a typical example of a cartridge core side of the magnetic tape.

As described above, the magnetic tape is usually accommodated in the magnetic tape cartridge in a state of being wound around the reel hub. Therefore, long-term storage of the magnetic tape after the data with a low access frequency is recorded is usually performed in a state where the magnetic tape is accommodated in the magnetic tape cartridge. In the magnetic tape wound around the reel hub, a magnetic layer surface is in contact with a back coating layer (in a case where it has a back coating layer) or a surface of the non-magnetic support opposite to the magnetic layer (in a case where it does not have a back coating layer). Therefore, the magnetic layer is in a pressed state in the magnetic tape cartridge. In particular, it is supposed that a higher pressure is applied to the cartridge core side due to stress than to other parts. This is considered to be the reason why running stability is likely to be low on the cartridge core side of the magnetic tape after long-term storage.

The present inventor has conducted intensive studies to provide means for improving running stability on the cartridge core side of the magnetic tape after long-term storage. In this study, as a result of various simulations, the present inventor has concluded that as a storage condition under an accelerated environment equivalent to a long-term storage (an example of archiving) of about 10 years under a room temperature environment of a relative humidity of 40% to 60%, it is appropriate to store the magnetic tape in a state of being accommodated in the magnetic tape cartridge in an environment of an atmosphere temperature of 60° C. and a relative humidity of 80% for 24 hours. In the present invention and the present specification, a room temperature means a temperature in a range of 20° C. to 25° C.

Therefore, the present inventor has conducted a running stability test on the cartridge core side after the magnetic tape cartridge accommodating the magnetic tape therein is stored in an environment of an atmosphere temperature of 60° C. and a relative humidity of 80% for 24 hours, and as a result of intensive studies based on the results of this test, it has been found that the magnetic tape having a C—H derived C concentration of 45 at % or more after storage has excellent running stability on the cartridge core side after storage under the accelerated environment, that is, running stability on the cartridge core side in a state equivalent to a state after the long-term storage. This point is a new finding that has not been known conventionally.

A method for measuring the C—H derived C concentration after storage will be described below. In the present invention and the present specification, the "magnetic layer surface (surface of the magnetic layer)" has the same meaning as a surface of the magnetic tape on a magnetic layer side.

"X-ray photoelectron spectroscopic analysis" is an analysis method generally also called electron spectroscopy for chemical analysis (ESCA) or X-ray photoelectron spectroscopy (XPS). In the following, X-ray photoelectron spectroscopic analysis will also be referred to as ESCA. ESCA is an analysis method using a phenomenon of photoelectron emission in a case where a surface of a sample to be measured is irradiated with X-rays, and is widely used as an analysis method for a surface layer portion of the sample to be measured. According to ESCA, qualitative analysis and quantitative analysis can be performed using X-ray photoelectron spectroscopic spectra obtained by analysis on the surface of the sample to be measured. Generally, the following expression holds between a depth from the sample surface to the analysis position (hereinafter, also referred to as a "detection depth") and a photoelectron take-off angle (take-off angle): detection depth≈mean free path of electrons×3×sin θ. In the expression, the detection depth is a depth at which 95% of photoelectrons constituting X-ray photoelectron spectroscopic spectra are generated, and θ is a photoelectron take-off angle. From the expression described above, it can be seen that, as the photoelectron take-off angle decreases, the analysis regarding a shallow part of the depth from the sample surface can be performed, and as the photoelectron take-off angle increases, the analysis regarding a deep part of the depth can be performed. In the analysis performed by ESCA at a photoelectron take-off angle of 10 degrees, an extremely outermost surface layer portion having a depth of about several nm from the sample surface generally is an analysis position. Therefore, according to the analysis performed by ESCA on the surface of the magnetic layer of the magnetic tape at a photoelectron take-off angle of 10 degrees, it is possible to perform composition analysis regarding the extremely outermost surface layer portion having a depth of about several nm from the surface of the magnetic layer.

The C—H derived C concentration is a proportion of carbon atoms C constituting a C—H bond with respect to total (based on atom) 100 at % of all elements detected by the qualitative analysis performed by ESCA. A region for the analysis is a region having an area of 300 μm×700 μm at any position on the surface of the magnetic layer in the inner region during winding of the magnetic tape. The qualitative analysis is performed by wide scan measurement (pass energy: 160 eV, scan range: 0 to 1200 eV, energy resolution: 1 eV/step) performed by ESCA. Then, spectra of all the elements detected by the qualitative analysis are obtained by narrow scan measurement (pass energy: 80 eV, energy resolution: 0.1 eV, scan range: set for each element so that the entire spectra to be measured is included). An atomic concentration (unit: at %) of each element is calculated from the peak area of each spectrum thus obtained. Here, an atomic concentration (C concentration) of carbon atoms is also calculated from the peak area of C1s spectra.

In addition, C1s spectra are acquired (pass energy: 10 eV, scan range: 276 to 296 eV, energy resolution: 0.1 eV/step). The acquired C1s spectra are fitted by a nonlinear least-squares method using a Gauss-Lorentz complex function (Gaussian component: 70%, Lorentz component: 30%), a peak of a C—H bond in the C1s spectra is separated, and a proportion (peak area ratio) of the separated C—H peak in the C1s spectra is calculated. A C—H derived C concentration is calculated by multiplying the calculated C—H peak area ratio by the C concentration.

The above process is performed three times at different positions on the surface of the magnetic layer in the inner region during winding of the magnetic tape taken out from the magnetic tape cartridge after storage. Measurement in an ESCA device is performed within 24 hours after the storage is completed. An arithmetic average of values thus obtained is set as a C—H derived C concentration after storage. In addition, a specific aspect of the above process will be shown in Examples described below.

The magnetic tape includes one or more components selected from the group consisting of a fatty acid and a fatty acid amide in a portion on the magnetic layer side on the non-magnetic support. In the present invention and the present specification, the "portion on the magnetic layer side on the non-magnetic support" refers to a magnetic layer in a case of a magnetic tape having a magnetic layer directly on a non-magnetic support, and a magnetic layer and/or a non-magnetic layer in a case of a magnetic tape having a non-magnetic layer between the non-magnetic support and the magnetic layer, which will be described in detail below. In the following, the "portion on the magnetic layer side on the non-magnetic support" is also simply referred to as a "portion on the magnetic layer side".

The fatty acid and the fatty acid amide included in the portion on the magnetic layer side of the magnetic tape are components that can each function as a lubricant in the magnetic tape. It is considered that a C—H derived C concentration obtained by the analysis performed by ESCA at a photoelectron take-off angle of 10 degrees on the surface of the magnetic layer of the magnetic tape including one or more of these components in the portion on the magnetic layer side on the non-magnetic support is an index for the presence amount of the components (one or more components selected from the group consisting of a fatty acid and a fatty acid amide) in the extremely outermost surface layer portion of the magnetic layer. Details are as follows.

In the X-ray photoelectron spectroscopic spectra (horizontal axis: bonding energy, vertical axis: intensity) obtained by the analysis performed by ESCA, the C1s spectra include information on an energy peak of a 1s orbit of the carbon atoms C. In such C1s spectra, a peak positioned at the vicinity of the bonding energy of 284.6 eV is a C—H peak. This C—H peak is a peak derived from the bonding energy of the C—H bond of the organic compound. It is supposed that in the magnetic tape including one or more components selected from the group consisting of a fatty acid and a fatty acid amide in the portion on the magnetic layer side on the non-magnetic support (in other words, one or more components selected from the group consisting of a fatty acid and a fatty acid amide are detected from the portion on the magnetic layer side on the non-magnetic support), main constituent components of the C—H peak are components selected from the group consisting of a fatty acid and a fatty acid amide in the extremely outermost surface layer portion of the magnetic layer. Therefore, it is considered that the C—H derived C concentration can be used as an index for the presence amount of the component as described above.

It is considered that a state where the C—H derived C concentration is 45 at % or more on the surface of the magnetic layer in the inner region during winding of the magnetic tape after storage, that is, a state where a large amount of one or more components selected from the group consisting of a fatty acid and a fatty acid amide is present in the extremely outermost surface layer portion of the magnetic layer in the inner region during winding of the magnetic tape after storage contributes to promoting smooth sliding (improving sliding) between the magnetic head and the magnetic layer surface on the cartridge core side in a case where data recorded on the magnetic tape is reproduced after long-term storage. It is supposed that this improvement in sliding can increase running stability on the cartridge core side after long-term storage.

However, the above description is merely supposition, and the present invention is not limited to such supposition. In addition, the present invention is not limited to another supposition described in the present specification.

Hereinafter, the magnetic tape cartridge will be described more specifically.

Magnetic Tape

C—H Derived C Concentration after Storage

Regarding the magnetic tape cartridge, the C—H derived C concentration after storage of the magnetic tape is 45 at % or more, and from a viewpoint of further improving running stability on the cartridge core side of the magnetic tape after long-term storage, it is preferably 48 at % or more, and more preferably 50 at % or more. According to the study of the present inventor, from a viewpoint of easy formation of the magnetic layer having high surface smoothness, the C—H derived C concentration after storage is preferably, for example, 95 at % or less, 90 at % or less, 85 at % or less, 80 at % or less, 75 at % or less, or 70 at % or less.

The C—H derived C concentration after storage described above can be controlled by, for example, the type of non-magnetic filler used for the magnetic layer, the manufacturing process of the magnetic tape, the material of the reel hub around which the magnetic tape is wound in the magnetic tape cartridge, and the like. Details will be described below.

Fatty Acid and Fatty Acid Amide

The magnetic tape includes one or more components selected from the group consisting of a fatty acid and a fatty acid amide in the portion on the magnetic layer side on the non-magnetic support. The portion on the magnetic layer side may include only one or both of a fatty acid and a fatty acid amide.

Examples of the fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferred, and stearic acid is more preferred. The fatty acid may be included in the magnetic layer in a form of a salt such as a metal salt.

Examples of the fatty acid amide include amides of the above various exemplified fatty acids, specifically, for example, lauric acid amide, myristic acid amide, palmitic acid amide, stearic acid amide, and the like.

For the fatty acid and a derivative of the fatty acid (such as amide and ester described below), a fatty acid-derived moiety of the fatty acid derivative preferably has a structure which is the same as or similar to that of the fatty acid used in combination. For example, in a case where stearic acid is used as the fatty acid, it is preferable to use stearic acid amide and/or stearic acid ester in combination.

In an aspect, the magnetic tape including one or more components selected from the group consisting of a fatty acid and a fatty acid amide in the portion on the magnetic layer side can be manufactured by forming the magnetic layer using a magnetic layer forming composition including one or more components selected from the group consisting of a fatty acid and a fatty acid amide. In addition, in an aspect, the magnetic tape including one or more components selected from the group consisting of a fatty acid and a fatty acid amide in the portion on the magnetic layer side can be manufactured by forming the non-magnetic layer using a non-magnetic layer forming composition including one or more components selected from the group consisting of a fatty acid and a fatty acid amide. In addition, in an aspect, the magnetic tape including one or more components selected from the group consisting of a fatty acid and a fatty acid amide in the portion on the magnetic layer side can be manufactured by forming the non-magnetic layer using a non-magnetic layer forming composition including one or more components selected from the group consisting of a fatty acid and a fatty acid amide and forming the magnetic layer using a magnetic layer forming composition including one or more components selected from the group consisting of a fatty acid and a fatty acid amide. The non-magnetic layer can play a role of holding a lubricant such as a fatty acid and a fatty acid amide and supplying the lubricant to the magnetic layer. The lubricant such as a fatty acid and a fatty acid amide included in the non-magnetic layer may be transferred to the magnetic layer and present in the magnetic layer.

A content of a fatty acid in the magnetic layer (or a magnetic layer forming composition; the same applies hereinafter) is, for example, 0.1 to 10.0 parts by mass, and preferably 1.0 to 7.0 parts by mass per 100.0 parts by mass of the ferromagnetic powder. In a case where two or more different fatty acids are added to the magnetic layer forming composition, the content thereof means the total content of two or more different fatty acids. The same applies to other components. In addition, in the present invention and the present specification, unless otherwise noted, a certain component may be used alone or in combination of two or more.

A content of a fatty acid amide in the magnetic layer is, for example, 0.1 to 3.0 parts by mass, and preferably 0.1 to 1.0 part by mass per 100.0 parts by mass of the ferromagnetic powder.

On the other hand, a content of fatty acid in the non-magnetic layer (or a non-magnetic layer forming composition; the same applies hereinafter) is, for example, 1.0 to 10.0 parts by mass, and preferably 1.0 to 7.0 parts by mass per 100.0 parts by mass of the non-magnetic powder. In addition, a content of a fatty acid amide in the non-magnetic layer is, for example, 0.1 to 3.0 parts by mass, and preferably 0.1 to 1.0 part by mass per 100.0 parts by mass of the non-magnetic powder.

Next, the magnetic layer and the like included in the magnetic tape will be described in more detail.

Magnetic Layer

Ferromagnetic Powder

As the ferromagnetic powder included in the magnetic layer, well-known ferromagnetic powder as ferromagnetic powder used in magnetic layers of various magnetic recording media can be used alone or in combination of two or more. From a viewpoint of improving recording density, it is preferable to use ferromagnetic powder having a small average particle size. From this point, the average particle size of ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from a viewpoint of magnetization stability, the average particle size of ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferred specific examples of the ferromagnetic powder include hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, "hexagonal ferrite powder" refers to ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and the present specification, hexagonal strontium ferrite powder means that the main divalent metal atom included in this powder is a strontium atom, and hexagonal barium ferrite powder means that the main divalent metal atom included in this powder is a barium atom. The main divalent metal atom refers to a divalent metal atom that accounts for the most on an at % basis among divalent metal atoms included in the powder. Here, a rare earth atom is not included in the above divalent metal atom. The "rare earth atom" in the present invention and the present specification is selected from the group consisting of a scandium atom (Sc), an yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is an aspect of the hexagonal ferrite powder, will be described in more detail.

An activation volume of hexagonal strontium ferrite powder is preferably in a range of 800 to 1600 nm$^3$. The finely granulated hexagonal strontium ferrite powder having an activation volume in the above range is suitable for manufacturing a magnetic tape exhibiting excellent electromagnetic conversion characteristics. The activation volume of the hexagonal strontium ferrite powder is preferably 800 nm$^3$ or more, for example, 850 nm$^3$ or more. Further, from a viewpoint of further improving the electromagnetic conversion characteristics, the activation volume of the hexagonal strontium ferrite powder is more preferably 1500 nm$^3$ or less, still more preferably 1400 nm$^3$ or less, still more preferably 1300 nm$^3$ or less, still more preferably 1200 nm$^3$ or less, and still more preferably 1100 nm$^3$ or less. The same applies to an activation volume of the hexagonal barium ferrite powder.

The "activation volume" is a unit of magnetization reversal and is an index indicating the magnetic size of a particle. An activation volume described in the present invention and the present specification and an anisotropy constant Ku which will be described later are values obtained from the following relational expression between a coercivity Hc and an activation volume V, by performing measurement in a coercivity Hc measurement portion at a magnetic field sweep rate of 3 minutes and 30 minutes using a vibrating sample magnetometer (measurement temperature: 23° C.±1° C.). For a unit of the anisotropy constant Ku, 1 erg/cc=1.0×10$^{-1}$ J/m$^3$.

$$Hc=2Ku/Ms\{1-[(kT/KuV)\ln(At/0.693)]^{1/2}\}$$

[In the above formula, Ku: anisotropy constant (unit: J/m$^3$), Ms: saturation magnetization (Unit: kA/m), k: Boltzmann constant, T: absolute temperature (unit: K), V: activation volume (unit: cm$^3$), A: spin precession frequency (unit: s$^{-1}$), t: magnetic field reversal time (unit: s)]

An index for reducing thermal fluctuation, in other words, improving thermal stability may include an anisotropy constant Ku. The hexagonal strontium ferrite powder preferably has Ku of 1.8×10$^5$ J/m$^3$ or more, and more preferably has Ku of 2.0×10$^5$ J/m$^3$ or more. Ku of the hexagonal strontium ferrite powder may be, for example, 2.5×10$^5$ J/m$^3$ or less. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and the present specification, the "rare earth atom surface layer portion uneven distribution property" means that a rare earth atom content with respect to 100 at % of an iron atom in a solution obtained by partially dissolving hexagonal strontium ferrite powder with an acid (hereinafter, referred to as a "rare earth atom surface layer portion content" or simply a "surface layer portion content" for a rare earth atom.) and a rare earth atom content with respect to 100 at % of an iron atom in a solution obtained by totally dissolving hexagonal strontium ferrite powder with an acid (hereinafter, referred to as a "rare earth atom bulk content" or simply a "bulk content" for a rare earth atom.) satisfy a ratio of a rare earth atom surface layer portion content/a rare earth atom bulk content >1.0. A rare earth atom content in hexagonal strontium ferrite powder which will be described later is the same meaning as the rare earth atom bulk content. On the other hand, partial dissolution using an acid dissolves a surface layer portion of a particle configuring hexagonal strontium ferrite powder, and thus, a rare earth atom content in a solution obtained by partial dissolution is a rare earth atom content in a surface layer portion of a particle configuring hexagonal strontium ferrite powder. A rare earth atom surface layer portion content satisfying a ratio of "rare earth atom surface layer portion content/rare earth atom bulk content >1.0" means that in a particle of hexagonal strontium ferrite powder, rare earth atoms are unevenly distributed in a surface layer portion (that is, more than an inside). The surface layer portion in the present invention and the present specification means a partial region from a surface of a particle configuring hexagonal strontium ferrite powder toward an inside.

In a case where hexagonal strontium ferrite powder includes a rare earth atom, a rare earth atom content (bulk content) is preferably in a range of 0.5 to 5.0 at % with respect to 100 at % of an iron atom. It is supposed that a bulk content in the above range of the included rare earth atom and uneven distribution of the rare earth atoms in a surface layer portion of a particle configuring hexagonal strontium ferrite powder contribute to suppression of a decrease in reproduction output during repeated reproduction. It is supposed that this is because hexagonal strontium ferrite powder includes a rare earth atom with a bulk content in the above range, and rare earth atoms are unevenly distributed in a surface layer portion of a particle configuring hexagonal strontium ferrite powder, so that it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproduction output during repeated reproduction. It is supposed that uneven distribution of rare earth atoms in a particulate surface layer portion of hexagonal strontium ferrite powder contributes to stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that hexagonal strontium ferrite powder having rare earth atom surface layer portion uneven distribution property can also contribute to an improvement of running durability of the magnetic tape. It is supposed that this may be because uneven distribution of rare earth atoms on a surface of a particle configuring hexagonal strontium ferrite powder contributes to an improvement of interaction between the particle surface and an organic substance (for example, a binding agent and/or an additive) included in the magnetic layer, and, as a result, a strength of the magnetic layer is improved.

From a viewpoint of further suppressing a decrease in reproduction output during repeated reproduction and/or a viewpoint of further improving running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and the present specification, unless otherwise noted, the content of an atom means a bulk content obtained by totally dissolving hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more kinds of rare earth atoms is obtained for the total of two or more kinds of rare earth atoms. This also applies to other components in the present invention and the present specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further suppressing a decrease in reproduction output during repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms need only be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be 1.5 or more. "Surface layer portion content/bulk content" larger than 1.0 means that in a particle configuring the hexagonal strontium ferrite powder, rare earth atoms are unevenly distributed in the surface layer portion (that is, more than in the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms need only be unevenly distributed in the surface layer portion of a particle configuring the hexagonal strontium ferrite powder, and "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-091747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 mL of 1 mol/L hydrochloric acid is held on a hot plate at a set temperature of 70° C. for 1 hour. The obtained solution is filtered by a membrane filter of 0.1 µm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 mL of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From a viewpoint of increasing the reproduction output in a case of reproducing data recorded on the magnetic tape, it is desirable that mass magnetization σs of the ferromagnetic powder included in the magnetic tape is high. In this regard, the hexagonal strontium ferrite powder including a rare earth atom but not having the rare earth atom surface layer portion uneven distribution property tends to have σs largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In an aspect, σs of the hexagonal strontium ferrite powder may be 45 A·m$^2$/kg or more, and may be 47 A·m$^2$/kg or more. On the other hand, from a viewpoint of noise reduction, σs is preferably 80 A·m$^2$/kg or less and more preferably 60 A·m$^2$/kg or less. σs can be measured using a well-known measuring device, such as a vibrating sample magnetometer, capable of measuring magnetic properties. In the present invention and the present specification, unless otherwise noted, the mass magnetization σs is a value measured at a magnetic field intensity of 15 kOe. 1[kOe]=$10^6$/4π[A/m]

Regarding the content (bulk content) of a constituent atom of the hexagonal strontium ferrite powder, a strontium atom content may be, for example, in a range of 2.0 to 15.0 at % with respect to 100 at % of an iron atom. In an aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder are, for example, in a range of 0.05 to 5.0 at % with respect to 100 at % of an iron atom, respectively.

As a crystal structure of hexagonal ferrite, a magnetoplumbite type (also referred to as an "M type".), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom can be, for example, 0.5 to 10.0 at % with respect to 100 at % of an iron atom. From a viewpoint of further suppressing a decrease in reproduction output during repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and the present specification, "not include" for a certain atom means that a content measured by an ICP analyzer after total dissolution is 0 mass %. A detection limit of the ICP analyzer is usually 0.01 parts per million (ppm) or less on a mass basis. The "not included" is used as a meaning including that an atom is included in an amount less than the detection limit of the ICP analyzer. In an aspect, the hexagonal strontium ferrite powder may not include a bismuth atom (Bi).

Metal Powder

Preferable specific examples of the ferromagnetic powder include ferromagnetic metal powder. For details of the ferromagnetic metal powder, for example, descriptions disclosed in paragraphs 0137 to 0141 of JP2011-216149A and paragraphs 0009 to 0023 of JP2005-251351A can be referred to.

ε-Iron Oxide Powder

Preferable specific examples of the ferromagnetic powder include ε-iron oxide powder. In the present invention and the present specification, "ε-iron oxide powder" refers to ferromagnetic powder in which a ε-iron oxide type crystal structure is detected as a main phase by X-ray diffraction analysis. For example, in a case where the highest intensity diffraction peak is attributed to a ε-iron oxide type crystal structure in an X-ray diffraction spectrum obtained by X-ray diffraction analysis, it is determined that the ε-iron oxide type crystal structure is detected as the main phase. As a manufacturing method of the ε-iron oxide powder, a manufacturing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. 5280 to 5284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic tape is not limited to the methods described here.

An activation volume of the ε-iron oxide powder is preferably in a range of 300 to 1500 $nm^3$. The finely granulated ε-iron oxide powder having an activation volume in the above range is suitable for manufacturing a magnetic tape exhibiting excellent electromagnetic conversion characteristics. The activation volume of the ε-iron oxide powder is preferably 300 $nm^3$ or more, for example, 500 $nm^3$ or more. Further, from a viewpoint of further improving the electromagnetic conversion characteristics, the activation volume of the ε-iron oxide powder is more preferably 1400 $nm^3$ or less, still more preferably 1300 $nm^3$ or less, still more preferably 1200 $nm^3$ or less, and still more preferably 1100 $nm^3$ or less.

An index for reducing thermal fluctuation, in other words, improving thermal stability may include an anisotropy constant Ku. The ε-iron oxide powder preferably has Ku of $3.0 \times 10^4$ $J/m^3$ or more, and more preferably has Ku of $8.0 \times 10^4$ $J/m^3$ or more. Ku of the ε-iron oxide powder may be, for example, $3.0 \times 10^5$ $J/m^3$ or less. Here, it means that the higher Ku is, the higher thermal stability is, this is preferable, and thus, a value thereof is not limited to the values exemplified above.

From a viewpoint of increasing the reproduction output in a case of reproducing data recorded on the magnetic tape, it is desirable that mass magnetization σs of the ferromagnetic powder included in the magnetic tape is high. In this regard, in an aspect, σs of the ε-iron oxide powder may be 8 $A \cdot m^2/kg$ or more, and may be 12 $A \cdot m^2/kg$ or more. On the other hand, from a viewpoint of noise reduction, σs of the ε-iron oxide powder is preferably 40 $A \cdot m^2/kg$ or less and more preferably 35 $A \cdot m^2/kg$ or less.

In the present invention and the present specification, unless otherwise noted, an average particle size of various types of powder such as ferromagnetic powder is a value measured by the following method using a transmission electron microscope.

The powder is imaged at a magnification ratio of 100,000 using a transmission electron microscope, and the image is printed on printing paper so that the total magnification ratio is 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described later is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is interposed between the particles. The term "particle" is used to describe powder in some cases.

As a method of taking sample powder from the magnetic tape in order to measure the particle size, a method disclosed in a paragraph of 0015 of JP2011-048878A can be used, for example.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

A content (filling percentage) of the ferromagnetic powder of the magnetic layer is preferably in a range of 50 to 90 mass % and more preferably in a range of 60 to 90 mass %. A high filling percentage of the ferromagnetic powder in the magnetic layer is preferable from a viewpoint of improving recording density.

Binding Agent

The above-described magnetic tape may be a coating type magnetic tape, and may include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can also be used as the binding agent in a non-magnetic layer and/or a back coating layer which will be described below.

For the binding agent described above, descriptions disclosed in paragraphs 0028 to 0031 of JP2010-024113A can be referred to. An average molecular weight of the resin osed as the binding agent can be, for example, 10,000 or more and 200,000 or less as a weight-average molecular weight. The weight-average molecular weight of the present invention and the present specification is a value obtained by performing polystyrene conversion of a value measured by gel permeation chromatography (GPC) under the following measurement conditions. A weight-average molecular weight of a binding agent shown in Examples which will be described later is a value obtained by performing polystyrene conversion of a value measured under the following measurement conditions. The binding agent can be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

In addition, a curing agent can also be used together with the resin which can be used as the binding agent. As the curing agent, in an aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. Curing reaction proceeds during a process of forming a magnetic layer, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in a magnetic layer forming composition in an amount of, for example, 0 to 80.0 parts by mass, and preferably 50.0 to 80.0 parts by mass, from a viewpoint of improving a strength of the magnetic layer, with respect to 100.0 parts by mass of the binding agent.

The above description regarding the binding agent and the curing agent can be applied to the non-magnetic layer and/or the back coating layer. In this case, the above description regarding the content can be applied by replacing the ferromagnetic powder with the non-magnetic powder.

Additive

The magnetic layer may include one or more additives as necessary in addition to the above-described various components. As the additive, a commercially available product can be appropriately selected and used according to a desired property. Alternatively, a compound synthesized by a well-known method can be used as the additive. Examples of the additive include the curing agent described above. In addition, examples of the additive which can be included in the magnetic layer include a non-magnetic filler, a lubricant, a dispersing agent, a dispersing assistant, an antibacterial agent, an antistatic agent, and an antioxidant. The non-magnetic filler is the same meaning as a non-magnetic particle or non-magnetic powder. Examples of the non-magnetic filler include a non-magnetic filler capable of functioning as a protrusion forming agent and a non-magnetic filler capable of functioning as an abrasive. Further, as the additive, well-known additives such as various polymers disclosed in paragraphs 0030 to 0080 of JP2016-051493A can also be used.

Protrusion Forming Agent

As a protrusion forming agent which is an aspect of the non-magnetic filler, a particle of an inorganic substance can be used, a particle of an organic substance can be used, and a composite particle of an inorganic substance and an organic substance can also be used. Examples of the inorganic substance include an inorganic oxide such as metal oxide, metal carbonate, metal sulfate, metal nitride, metal carbide, and metal sulfide, and an inorganic oxide is preferable. In an aspect, the protrusion forming agent may be an inorganic oxide-based particle. Here, the "-based" is used to mean "including". An aspect of the inorganic oxide-based particle is a particle made of an inorganic oxide. Another aspect of the inorganic oxide-based particle is a composite particle of an inorganic oxide and an organic substance, and specific examples thereof include a composite particle of an inorganic oxide and a polymer. Examples of such particle include a particle having a polymer bonded to a surface of an inorganic oxide particle.

An average particle size of the protrusion forming agent is, for example, 30 to 300 nm, and preferably 40 to 200 nm. As described above, it is supposed that a high pressure is applied to the cartridge core side of the magnetic tape during long-term storage. In addition, it is supposed that a high pressure is applied to the cartridge core side of the magnetic tape even during storage in the above storage environment equivalent to such long-term storage. The closer the particle shape is to a true sphere, the smaller the pushing resistance working in a case where a high pressure is applied, so that the particle is likely to be pushed into the magnetic layer. On the other hand, in a case where the particle shape is a shape away from the true sphere, for example, a so-called deformed shape, a large pushing resistance is likely to work in a case where a high pressure is applied, so that the particle is hardly pushed into the magnetic layer. In addition, even a particle having a non-uniform surface and a low surface smoothness is likely to have a large pushing resistance in a case where a high pressure is applied, so that the particle is hardly pushed into the magnetic layer. It is considered that in a case where the particle that is easily pushed into the magnetic layer is included in the magnetic layer, even though components selected from the group consisting of a fatty acid and a fatty acid amide are localized in the extremely outermost surface layer portion of the magnetic layer before storage due to the particle being pushed into the magnetic layer under a pressure during storage, the amount of localization decreases after storage. With respect to this, it is supposed that in a case where a particle of the protrusion forming agent is hardly pushed into the magnetic layer even though a pressure is applied, a decrease in amount of localization after storage can be suppressed. That is, it is supposed that the use of the protrusion forming agent that is hardly pushed into the magnetic layer even though a pressure is applied contributes to controlling of the C—H derived C concentration after storage, which is measured after storage in the above storage environment equivalent to long-term storage, to 45 at % or more.

Abrasive

An abrasive, which is another aspect of the non-magnetic filler, is preferably non-magnetic powder having a Mohs hardness of more than 8, and more preferably non-magnetic powder having a Mohs hardness of 9 or more. On the other hand, a Mohs hardness of the protrusion forming agent may be, for example, 8 or less or 7 or less. The maximum value of a Mohs hardness is 10 for diamond. Specifically, powder such as alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like can be mentioned, and among them, alumina powder such as α-alumina and silicon carbide powder are preferable. An average particle size of the abrasive is, for example, in a range of 30 to 300 nm, and preferably in a range of 50 to 200 nm.

From a viewpoint that the protrusion forming agent and the abrasive can exhibit their functions more satisfactorily, a content of the protrusion forming agent in the magnetic layer is preferably 1.0 to 4.0 parts by mass, and more preferably 1.2 to 3.5 parts by mass with respect to 100.0 parts by mass of the ferromagnetic powder. On the other hand, a content of the abrasive in the magnetic layer is preferably 1.0 to 20.0 parts by mass, more preferably 3.0 to 15.0 parts by mass, and still more preferably 4.0 to 10.0 parts by mass with respect to 100.0 parts by mass of the ferromagnetic powder.

As an example of the additive that can be used in the magnetic layer containing the abrasive, a dispersing agent disclosed in paragraphs 0012 to 0022 of JP2013-131285A can be used as a dispersing agent for improving dispersibility of the abrasive in the magnetic layer forming composition. For the dispersing agent, descriptions disclosed in paragraphs 0061 and 0071 of JP2012-133837A can be referred to. The dispersing agent may be included in the non-magnetic layer. For the dispersing agent which may be included in the non-magnetic layer, a description disclosed in a paragraph 0061 of JP2012-133837A can be referred to.

Fatty Acid Ester

One or both of the magnetic layer and the non-magnetic layer described in detail below may or may not include a fatty acid ester.

All of a fatty acid ester, a fatty acid, and a fatty acid amide are components that can function as a lubricant. The lubricant is generally broadly divided into a fluid lubricant and a boundary lubricant. A fatty acid ester is said to be a component that can function as a fluid lubricant, whereas a fatty acid and a fatty acid amide are said to be components that can function as boundary lubricants. It is considered that the boundary lubricant is a lubricant that can be attached to a surface of powder (for example, ferromagnetic powder) and form a rigid lubricating film to reduce contact friction. On the other hand, it is considered that the fluid lubricant is a lubricant that can form a liquid film on the magnetic layer surface to reduce friction due to flowing of the liquid film. As described above, it is considered that the fatty acid ester has a different action as a lubricant from the fatty acid and the fatty acid amide. The present inventor supposes that, in the inner region during winding of the magnetic tape, setting of the C—H derived C concentration, which is considered as an index for the presence amount of one or more components selected from the group consisting of a fatty acid and a fatty acid amide in the extremely outermost surface layer portion of the magnetic layer, to 45 at % or more as the value after storage, contributes to improvement of running stability on the cartridge core side of the magnetic tape after long-term storage.

Examples of the fatty acid ester include esters of the above-described various fatty acids exemplified for a fatty acid. Specific examples thereof include, for example, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

A content of a fatty acid ester in the magnetic layer is, for example, 0 to 10.0 parts by mass, and preferably 1.0 to 7.0 parts by mass per 100.0 parts by mass of the ferromagnetic powder.

A content of a fatty acid ester in the non-magnetic layer is, for example, 0 to 10.0 parts by mass, and preferably 1.0 to 7.0 parts by mass per 100.0 parts by mass of the non-magnetic powder.

The magnetic layer described above can be provided directly on a surface of the non-magnetic support or indirectly through the non-magnetic layer.

Non-Magnetic Layer

Next, the non-magnetic layer will be described. The above magnetic tape may have a magnetic layer directly on the non-magnetic support, or may have a non-magnetic layer including non-magnetic powder between the non-magnetic support and the magnetic layer. The non-magnetic powder used for the non-magnetic layer may be inorganic substance powder or organic substance powder. In addition, carbon black and the like can be used. Examples of the inorganic substance include metal, metal oxide, metal carbonate, metal sulfate, metal nitride, metal carbide, and metal sulfide. These types of non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. A content (filling percentage) of the non-magnetic powder of the non-magnetic layer is preferably in a range of 50 to 90 mass % and more preferably in a range of 60 to 90 mass %.

The non-magnetic layer can include a binding agent, and can also include an additive. For other details of a binding agent or an additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

In the present invention and the present specification, the non-magnetic layer also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. It is preferable that the non-magnetic layer does not have a residual magnetic flux density and a coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. A corona discharge, a plasma treatment, an easy-bonding treatment, or a heat treatment may be performed with respect to these supports in advance.

Back Coating Layer

The magnetic tape may or may not have a back coating layer including non-magnetic powder on a surface side of the non-magnetic support opposite to a surface side provided with the magnetic layer. The back coating layer preferably includes one or both of carbon black and inorganic powder. The back coating layer can include a binding agent and can also include an additive. In regards to the binding agent and the additive of the back coating layer, the well-known technology regarding the back coating layer can be applied, and the well-known technology regarding the treatment of the magnetic layer and/or the non-magnetic layer can be applied. For example, for the back coating layer, descriptions disclosed in paragraphs 0018 to 0020 of JP2006-331625A and page 4, line 65 to page 5, line 38 of U.S. Pat. No. 7,029,774B can be referred to.

Various Thicknesses

A thickness of the non-magnetic support is preferably 3.0 to 6.0 μm.

A thickness of the magnetic layer is preferably 0.15 μm or less, and more preferably 0.1 μm or less, from a viewpoint of high-density recording required in recent years. The thickness of the magnetic layer is still more preferably in a range of 0.01 to 0.1 μm. The magnetic layer need only be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 1.5 μm, and preferably 0.1 to 1.0 μm.

A thickness of the back coating layer is preferably 0.9 μm or less, and more preferably 0.1 to 0.7 μm.

Thicknesses of each layer and the non-magnetic support of the magnetic tape can be obtained by a well-known film thickness measurement method. As an example, a cross section of the magnetic tape in a thickness direction is exposed by a well-known method such as an ion beam or a microtome, and then the exposed cross section observation is performed using a scanning electron microscope, for example. In the cross section observation, various thicknesses can be obtained as a thickness obtained at one portion of the cross section, or an arithmetic average of thicknesses obtained at a plurality of portions of two or more portions, for example, two portions which are randomly extracted. In addition, the thickness of each layer may be obtained as a designed thickness calculated according to manufacturing conditions.

Manufacturing Process

Preparation of Each Layer Forming Composition

A process of preparing a composition for forming the magnetic layer, the non-magnetic layer, or the back coating layer can generally include at least a kneading process, a dispersing process, and a mixing process provided before and after these processes as necessary. Each process may be divided into two or more stages. Components used for the preparation of each layer forming composition may be added at an initial stage or in a middle stage of each process. As a solvent, one kind or two or more kinds of various kinds of solvents usually used for manufacturing a coating type magnetic recording medium can be used. For the solvent, for example, a description disclosed in a paragraph 0153 of JP2011-216149A can be referred to. In addition, each component can be separately added in two or more processes. In order to manufacture the magnetic tape, a conventionally well-known manufacturing technology can be used in various processes. In the kneading process, a kneader having a strong kneading force, such as an open kneader, a continuous kneader, a pressure kneader, or an extruder is preferably used. For details of these kneading treatments, JP1989-106338A (JP-H01-106338A) and JP1989-079274A (JP-H01-079274A) can be referred to. As a dispersing device, a well-known dispersing device can be used. Each layer forming composition may be filtered by a well-known method before being subjected to a coating process. The filtering can be performed by using a filter, for example. As the filter used for the filtering, a filter having a pore diameter of 0.01 to 3 µm (for example, filter made of glass fiber or filter made of polypropylene) can be used, for example.

In an aspect, in a process of preparing the magnetic layer forming composition, after a dispersion liquid including a protrusion forming agent (hereinafter, referred to as a "protrusion forming agent liquid") is prepared, the protrusion forming agent liquid can be mixed with one or more other components of the magnetic layer forming composition. For example, the magnetic layer forming composition can be prepared by separately preparing a protrusion forming agent liquid, a dispersion liquid including an abrasive (hereinafter, referred to as an "abrasive liquid"), and a dispersion liquid including ferromagnetic powder (hereinafter, referred to as a "magnetic liquid") and then mixing and dispersing them. It is preferable to prepare various dispersion liquids separately in this way in order to improve dispersibility of the ferromagnetic powder, the protrusion forming agent, and the abrasive in the magnetic layer forming composition. For example, the protrusion forming agent liquid can be prepared by a well-known dispersion treatment such as an ultrasonic treatment. The ultrasonic treatment can be performed for about 1 to 300 minutes at an ultrasonic output of about 10 to 2000 watts per 200 cc (1 cc=1 cm$^3$), for example. Moreover, the filtering may be performed after the dispersion treatment. For the filter used for the filtering, the above description can be referred to.

Coating Process, Cooling Process, and Heating and Drying Process

The magnetic layer can be formed by directly applying the magnetic layer forming composition onto the non-magnetic support or performing multilayer coating of the magnetic layer forming composition with the non-magnetic layer forming composition in order or at the same time. For details of coating for forming each layer, a description disclosed in a paragraph 0066 of JP2010-231843A can be referred to.

As described above, in one embodiment, the magnetic tape may have the non-magnetic layer including non-magnetic powder between the non-magnetic support and the magnetic layer. Such a magnetic tape can be preferably manufactured by sequential multilayer coating. A manufacturing process of performing the sequential multilayer coating can be preferably performed as follows. The non-magnetic layer is formed through a coating process of applying a non-magnetic layer forming composition onto a non-magnetic support to form a coating layer, and a heating and drying process of drying the formed coating layer by a heat treatment. Then, the magnetic layer is formed through a coating process of applying a magnetic layer forming composition onto the formed non-magnetic layer to form a coating layer, and a heating and drying process of drying the formed coating layer by a heat treatment.

In the non-magnetic layer forming process of the manufacturing method of performing such sequential multilayer coating, it is preferable to perform a coating process by using the non-magnetic layer forming composition including one or more components selected from the group consisting of a fatty acid and a fatty acid amide and to perform a cooling process of cooling the coating layer between the coating process and the heating and drying process, in order to adjust the C—H derived C concentration to be 45 at % or more in the magnetic tape including one or more components selected from the group consisting of a fatty acid and a fatty acid amide in the portion on the magnetic layer side on the non-magnetic support. The reason thereof is not clear, but it is supposed that this is because the above components (fatty acid and/or fatty acid amide) are transferred to the non-magnetic layer surface in a case of volatilization of a solvent in the heating and drying process, by cooling the coating layer of the non-magnetic layer forming composition before the heating and drying process. Further, it is considered that it is preferable to use the protrusion forming agent described above as the protrusion forming agent of the magnetic layer in order to suppress a decrease in amount of localization of the components localized in the extremely outermost surface layer portion of the magnetic layer before storage in the above storage environment equivalent to long-term storage after the storage.

In an aspect, in the magnetic layer forming process, a coating process of applying a magnetic layer forming composition including one or more components selected from the group consisting of a fatty acid and a fatty acid amide onto a non-magnetic layer to form a coating layer, and a heating and drying process of drying the formed coating layer by a heat treatment can be performed.

Hereinafter, an example of the manufacturing process of the magnetic tape will be described with reference to FIG. 1. However, the present invention is not limited to the following examples.

FIG. 1 is a schematic process diagram showing an example of a process of manufacturing a magnetic tape including a non-magnetic layer and a magnetic layer in this order on one surface of a non-magnetic support and a back coating layer on the other surface thereof. In the example shown in FIG. 1, an operation of sending a non-magnetic support (elongated film) from a sending part and winding the non-magnetic support around a winding part is continuously performed, and various treatments of coating, drying, and orientation are performed in each part or each zone shown in FIG. 1, and thus, it is possible to form a non-magnetic layer and a magnetic layer on one surface of the running non-magnetic support by sequential multilayer coating and to form a back coating layer on the other surface thereof. The example shown in FIG. 1 can be the same as the manufacturing process normally performed for manufacturing a coating type magnetic tape, except for including a cooling zone.

The non-magnetic layer forming composition is applied onto the non-magnetic support sent from the sending part in a first coating part (coating process of non-magnetic layer forming composition).

After the coating process, a coating layer of the non-magnetic layer forming composition formed in the coating process is cooled in a cooling zone (cooling process). For example, the cooling process can be performed by allowing the non-magnetic support on which the coating layer is formed to pass through a cooling atmosphere. An atmosphere temperature of the cooling atmosphere may be preferably in a range of $-10°$ C. to $0°$ C., and more preferably in a range of $-5°$ C. to $0°$ C. The time for performing the cooling process (for example, time while any part of the coating layer is delivered to and sent from the cooling zone (hereinafter, also referred to as a "staying time")) is not particularly limited. The C—H derived C concentration tends to increase as the staying time is increased. Thus, the staying time is preferably adjusted by performing preliminary experiment as necessary, so that the C—H derived C concentration of 45 at % or more is realized. In the cooling process, cooled air may blow to the surface of the coating layer.

After the cooling zone, in a first heat treatment zone, the coating layer is heated after the cooling process to dry the coating layer (heating and drying process). The heating and drying treatment can be performed by allowing the non-magnetic support including the coating layer after the cooling process to pass through a heating atmosphere. An atmosphere temperature of the heating atmosphere here is, for example, about $60°$ C. to $140°$ C. Here, the atmosphere temperature need only be a temperature at which a solvent is volatilized and the coating layer is dried, and the atmosphere temperature is not limited to the atmosphere temperature in the range described above. In addition, the heated air may optionally blow to the surface of the coating layer. The above points are also applied to a heating and drying process of a second heat treatment zone and a heating and drying process of a third heat treatment zone which will be described below, in the same manner.

Next, in a second coating part, the magnetic layer forming composition is applied onto the non-magnetic layer formed by performing the heating and drying process in the first heat treatment zone (coating process of magnetic layer forming composition).

After that, in an aspect of performing an orientation treatment, while the coating layer of the magnetic layer forming composition is in a wet state, an orientation treatment of the ferromagnetic powder in the coating layer is performed in an orientation zone. For the orientation treatment, the various well-known technologies including a description disclosed in a paragraph 0067 of JP2010-231843A can be used. For example, a vertical orientation treatment can be performed by a well-known method such as a method using a polar opposing magnet. In the orientation zone, a drying speed of the coating layer can be controlled depending on a temperature and a flow rate of dry air and/or a transportation speed of the non-magnetic support on which the coating layer is formed in the orientation zone. The coating layer may be preliminarily dried before the transportation to the orientation zone.

The coating layer after the orientation treatment is subjected to the heating and drying process in the second heat treatment zone.

Next, in a third coating part, a back coating layer forming composition is applied onto a surface of the non-magnetic support opposite to the surface on which the non-magnetic layer and the magnetic layer are formed, to form a coating layer. (coating process of back coating layer forming composition). After that, in the third heat treatment zone, the coating layer is heated and dried.

By the above process, it is possible to obtain the magnetic tape including the non-magnetic layer and the magnetic layer in this order on one surface of the non-magnetic support and the back coating layer on the other surface thereof.

In order to manufacture the magnetic tape, various well-known treatments for manufacturing the coating type magnetic recording medium can be performed. For the various treatments, for example, descriptions disclosed in paragraphs 0067 to 0069 of JP2010-231843A can be referred to.

By doing so, the magnetic tape can be obtained. However, the manufacturing method described above is merely an example, the C—H derived C concentration after storage can be controlled to 45 at % or more by any method capable of adjusting the C—H derived C concentration after storage, and such an aspect is also included in the present invention.

It is possible to form a servo pattern in the magnetic tape manufactured as described above by a well-known method in order to enable tracking control of the magnetic head in the magnetic tape apparatus, control of a running speed of the magnetic tape, and the like. The "formation of the servo pattern" can also be referred to as "recording of a servo signal". The formation of the servo pattern will be described below.

The servo pattern is usually formed along a longitudinal direction of the magnetic tape. Examples of control (servo control) types using a servo signal include a timing-based servo (TBS), an amplitude servo, and a frequency servo.

As shown in a european computer manufacturers association (ECMA)-319, a magnetic tape conforming to a linear tape-open (LTO) standard (generally referred to as an "LTO tape") employs a timing-based servo system. In the timing-based servo system, the servo pattern is formed by continuously disposing a plurality of pairs of non-parallel magnetic stripes (also referred to as "servo stripes") in a longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of servo signals continuous in a longitudinal direction of the magnetic tape. A plurality of the servo bands are usually provided on the magnetic tape. For example, in an LTO tape, the number is five. A region interposed between two adjacent servo bands is referred to as a data band. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in a longitudinal direction of the magnetic tape. Specifically, a method of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

Incidentally, as a method for uniquely specifying the servo band, there is a method using a staggered method as shown in ECMA-319. In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319, information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for servo pattern forming head is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 µm or less, 1 to 10 µm, 10 µm or more, and the like.

Before the servo pattern is formed on the magnetic tape, the magnetic tape is usually subjected to demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. The AC erasing is performed by gradually decreasing an intensity of the magnetic field while inverting a direction of the magnetic field applied to the magnetic tape. On the other hand, the DC erasing is performed by applying a one-direction magnetic field to the magnetic tape. As the DC erasing, there are two methods. A first method is horizontal DC erasing of applying a one-direction magnetic field along a longitudinal direction of the magnetic tape. A second method is vertical DC erasing of applying a one-direction magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed on the magnetic tape, the servo pattern is formed so that the direction of the magnetic field is reverse to the direction of the erasing. Therefore, an output of a servo signal obtained by reading the servo pattern can be increased. As shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

Configuration of Magnetic Tape Cartridge

The magnetic tape manufactured as described above is accommodated in a magnetic tape cartridge while being wound around a reel hub. Usually, a magnetic tape cartridge is mounted on the magnetic tape apparatus in a case where data is recorded on the magnetic tape and/or the recorded data is reproduced.

In the magnetic tape cartridge, the magnetic tape is accommodated inside a cartridge body in a state of being wound around a reel hub. The reel of the magnetic tape cartridge is configured of at least a reel hub, and usually, flanges are provided at both ends of the reel hub. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic tape apparatus for recording and/or reproducing data on the magnetic tape, the magnetic tape is pulled out of the magnetic tape cartridge to be wound around the reel on the magnetic tape apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic tape apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge. The magnetic tape cartridge is a single reel type magnetic tape cartridge in an aspect, and a dual reel type magnetic tape cartridge in the other aspect. In an aspect, the magnetic tape cartridge is preferably a single reel type magnetic tape cartridge that has been mainly adopted in the data storage field in recent years.

The reel hub is a cylindrical member constituting a shaft center part around which the magnetic tape is wound in the magnetic tape cartridge. In the magnetic tape cartridge, the reel hub can be a single-layer cylindrical member, or can be a multi-layer cylindrical member having two or more layers. From a viewpoint of manufacturing cost and ease of manufacturing, the reel hub is preferably a single-layer cylindrical member.

The present inventor considers that the high rigidity of the reel hub around which the reel is wound in the magnetic tape cartridge is preferable in order to increase the C—H derived C concentration after storage to 45 at % or more. This is due to the following reasons.

It is considered that the reel hub tends to receive a winding force in the center direction by the winding of the magnetic tape and deform in the direction in which the diameter decreases, and it is considered that the reel hub having lower rigidity is more likely to deform. On the cartridge core side of the magnetic tape, it is supposed that compressive stress is generated in the direction in which the tape length is shortened to correspond to the deformation of the reel hub and then tensile stress is generated in the direction in which the tape width is widened due to compression caused by this compressive stress. It is considered that, as the stress generated in this way increases, even though components selected from the group consisting of a fatty acid and a fatty acid amide are localized on the extremely outermost surface layer portion of the magnetic layer before storage, the amount of localization thereof decreases after storage. With respect to this, it is supposed that in a case where the rigidity of the reel hub is high, the deformation described above can be suppressed, so that the generation of the stress can be suppressed, and as a result, a decrease in amount of localization after storage can be suppressed. That is, it is supposed that the high rigidity of the reel hub contributes to controlling of the C—H derived C concentration after storage, which is measured after storage in a storage environment equivalent to long-term storage, to 45 at % or more. From this viewpoint, in an aspect, a flexural modulus of a material constituting at least an outer peripheral surface layer portion of the reel hub is preferably 5 GPa or more, more preferably 6 GPa or more, still more preferably 7 GPa or more, and still more preferably 8 GPa or more. The flexural modulus may be, for example, 20 GPa or less, 15 GPa or less, or 10 GPa or less. Here, since the high flexural modulus is preferable from a viewpoint of suppressing the deformation of the reel hub, the flexural modulus may exceed the value exemplified here.

In a case where the reel hub is a single-layer cylindrical member, the flexural modulus is a flexural modulus of a material constituting the cylindrical member. On the other hand, in a case where the reel hub is a multi-layer cylindrical member having two or more layers, the flexural modulus is a flexural modulus of a material constituting at least an outer peripheral surface layer portion of the reel hub. In the present invention and the present specification, the "flexural modulus" is a value determined according to Japanese Industrial Standards (JIS) K 7171:2016. JIS K 7171:2016 is a Japanese Industrial Standard created based on International Organization for Standardization (ISO) 178 and Amendment 1:2013 published as the 5th edition in 2010, without changing technical contents. A test piece used for measuring the flexural modulus is prepared according to item 6 "Test piece" of JIS K 7171:2016.

Examples of the material constituting the reel hub include a resin and a metal. Examples of the metal include aluminum. A resin is preferable from a viewpoint of cost and productivity. Examples of the resin include a fiber reinforced resin. Examples of the fiber reinforced resin include a glass fiber reinforced resin and a carbon fiber reinforced resin. As such a fiber reinforced resin, fiber reinforced polycarbonate is preferable. This is because polycarbonate is easily procured and can be molded with high accuracy and at low cost by a general-purpose molding machine such as an injection molding machine. In addition, in the glass fiber reinforced resin, the content of the glass fiber is preferably 15 mass % or more. The higher the content of the glass fiber, the higher the flexural modulus of the glass fiber reinforced resin tends to be. As an example, the glass fiber content of the glass fiber reinforced resin may be 50 mass % or less or 40 mass % or less. In an aspect, the resin constituting the reel hub is preferably glass fiber reinforced polycarbonate. In addition, as the resin constituting the reel hub, a high-strength resin generally called a super engineering plastic or the like can be mentioned. An example of a super engineering plastic is polyphenylene sulfide (PPS).

A thickness of the reel hub is preferably in a range of 2.0 to 3.0 mm from a viewpoint of achieving both the strength of the reel hub and the dimensional accuracy during molding. For a multi-layer reel hub having two or more layers, the thickness of the reel hub refers to the total thickness of such multi layers. An outer diameter of the reel hub is usually determined by the standard of the magnetic tape apparatus, and may be in a range of, for example, 20 to 60 mm The configuration of the magnetic tape cartridge will be described below with reference to the drawings. However, the embodiments shown in the drawings are examples, and the present invention is not limited to such examples.

Figure 2:
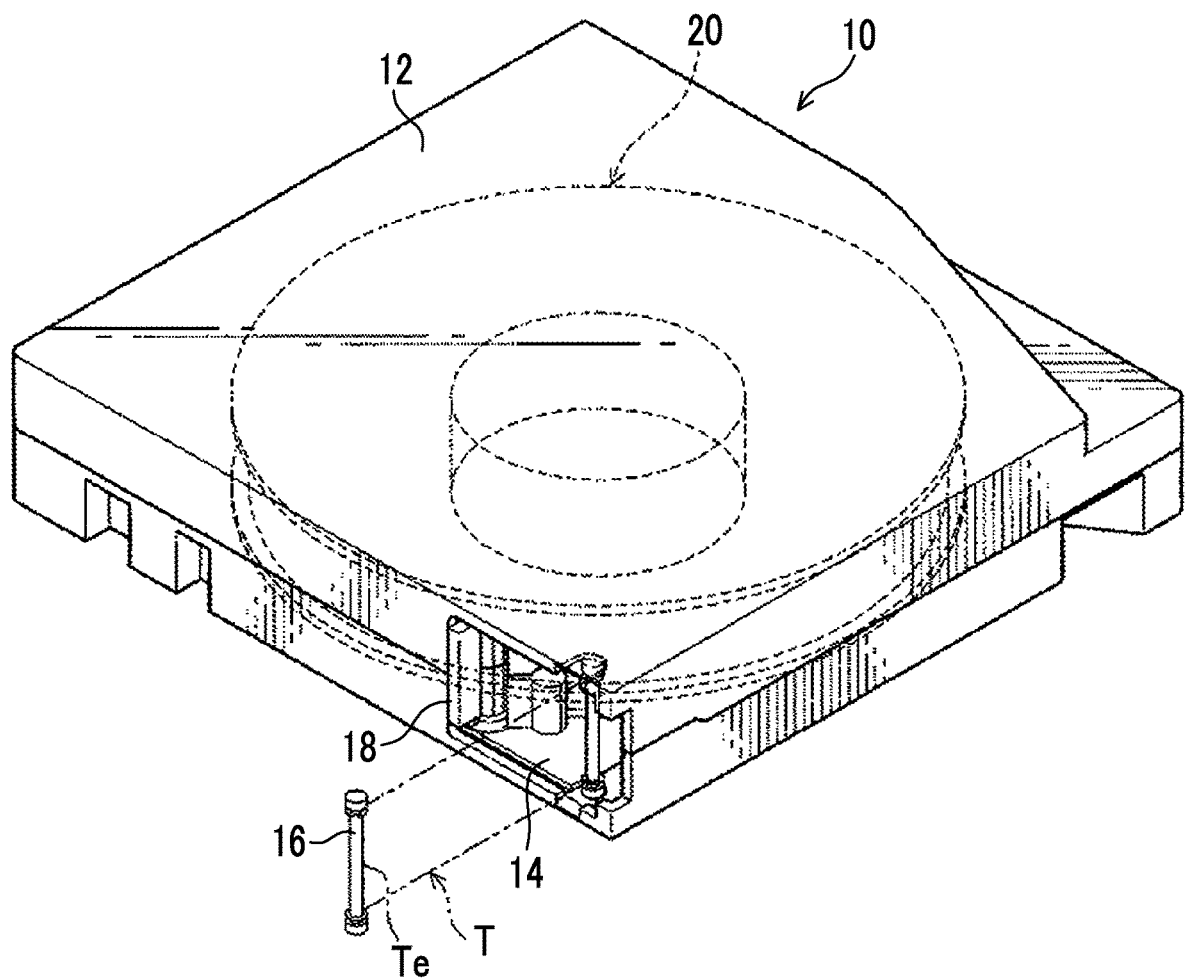
FIG. 2 is a perspective view of an example of a magnetic tape cartridge.

FIG. 2 is a perspective view of an example of the magnetic tape cartridge. FIG. 2 shows a single reel type magnetic tape cartridge.

A magnetic tape cartridge 10 shown in FIG. 2 has a case 12. The case 12 is formed in a rectangular box shape. The case 12 is usually made of a resin such as polycarbonate. Only one reel 20 is rotatably accommodated inside the case 12.

Figure 3:
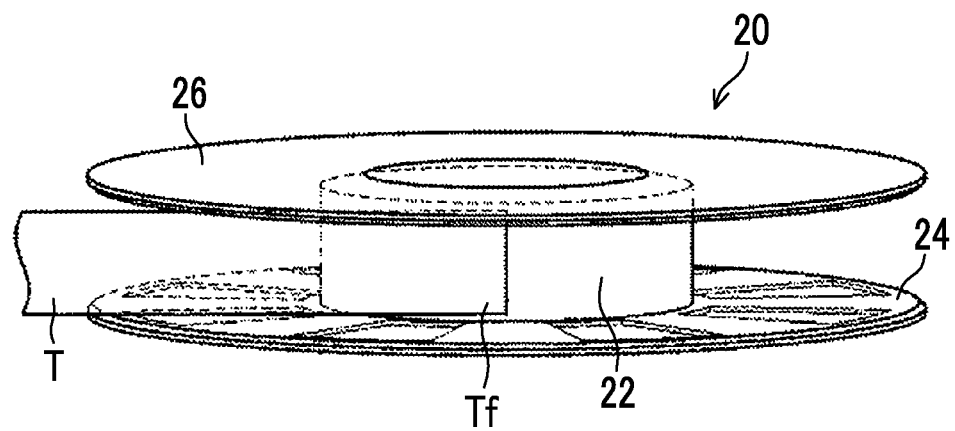
FIG. 3 is a perspective view in a case where the magnetic tape is started to be wound around a reel.
Figure 4:
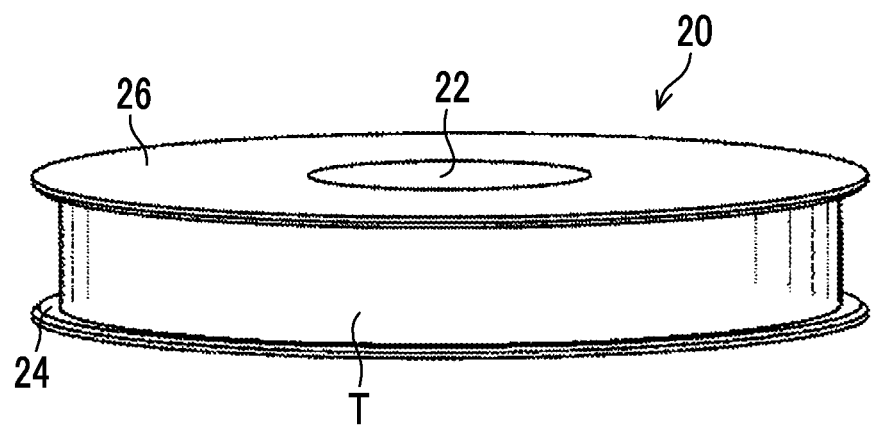
FIG. 4 is a perspective view in a case where the magnetic tape is wound around the reel.

FIG. 3 is a perspective view in a case where the magnetic tape is started to be wound around a reel. FIG. 4 is a perspective view in a case where the magnetic tape is wound around the reel.

The reel 20 has a cylindrical reel hub 22 constituting a shaft center part. The reel hub is as described in detail above.

Flanges (lower flange 24 and upper flange 26) projecting outward in the radial direction from a lower end and an upper end of the reel hub 22 are provided at both ends of the reel hub 22. Here, regarding "upper" and "lower", in a case where the magnetic tape cartridge is mounted on the magnetic tape apparatus, the side located above is referred to as "upper" and the side located below is referred to as "lower". One or both of the lower flange 24 and the upper flange 26 are preferably configured integrally with the reel hub 22 from a viewpoint of reinforcing the upper end side and/or the lower end side of the reel hub 22. The term "integrally configured" means that it is configured not as a separate member but as one member. In a first aspect, the reel hub 22 and the upper flange 26 are configured as one member, and this member is joined to the lower flange 24 configured as a separate member by a well-known method. In a second aspect, the reel hub 22 and the lower flange 24 are configured as one member, and this member is joined to the upper flange 26 configured as a separate member by a well-known method. The reel of the magnetic tape cartridge may be in any aspect. Each member can be manufactured by a well-known molding method such as injection molding.

A magnetic tape T is wound around an outer periphery of the reel hub 22 starting from a tape inner end Tf (see FIG. 3). The tension applied in the longitudinal direction of the magnetic tape in a case where the magnetic tape is wound around the reel hub is preferably 1.5 N (Newton) or less, more preferably 1.0 N or less, and also preferably tension-free.

An opening 14 for pulling out the magnetic tape T wound around the reel 20 is provided in a side wall of the case 12, and a leader pin 16 to be pulled out while being locked by a pull-out member (not shown) of the magnetic tape apparatus (not shown) is fixed to a tape outer end Te of the magnetic tape T pulled out from the opening 14.

The opening 14 is opened and closed by a door 18. The door 18 is formed in a shape of a rectangular plate having a size capable of closing the opening 14, and is urged by an urging member (not shown) in the direction of closing the opening 14. The magnetic tape cartridge 10 is mounted on the magnetic tape apparatus, the door 18 is opened against an urging force of the urging member.

For other details of the magnetic tape cartridge, a well-known technology can be applied. The total length of the magnetic tape accommodated in the magnetic tape cartridge is not particularly limited, and may be in a range of, for example, about 800 m to 2500 m. The longer the total length of the tape accommodated in one roll of the magnetic tape cartridge, the more preferable from a viewpoint of increasing the capacity of the magnetic tape cartridge.

Magnetic Tape Apparatus

Another aspect of the present invention relates to a magnetic tape apparatus including the magnetic tape cartridge.

In the present invention and the present specification, the "magnetic tape apparatus" means an apparatus capable of performing at least one of the recording of data on the magnetic tape or the reproducing of data recorded on the magnetic tape. Such an apparatus is generally called a drive. The magnetic tape apparatus can be a sliding type magnetic tape apparatus. The sliding type magnetic tape apparatus is an apparatus in which the magnetic layer surface and the magnetic head come into contact with each other to be slid on each other, in a case of performing the recording of data on the magnetic tape and/or reproducing of the recorded data.

The magnetic tape apparatus can include the magnetic tape cartridge attachably and detachably. Further, the magnetic tape apparatus can include a magnetic head. Such a magnetic head can be a recording head capable of performing the recording of data on the magnetic tape, or can be a reproducing head capable of performing the reproducing of data recorded on the magnetic tape. In addition, in an aspect, the magnetic tape apparatus can include both of a recording head and a reproducing head as separate magnetic heads. In another aspect, the magnetic head included in the magnetic tape apparatus can have a configuration that both of an element for recording data (recording element) and an element for reproducing data (reproducing element) are included in one magnetic head. Hereinafter, the element for recording and the element for reproducing data are collectively referred to as an "element for data". As the reproducing head, a magnetic head (MR head) including a magnetoresistive (MR) element capable of sensitively reading data recorded on the magnetic tape as a reproducing element is preferable. As the MR head, various known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic tape apparatus. For example, a magnetic head that records data and/or reproduces recorded data (hereinafter also referred to as "recording and reproducing head") can include two servo signal reading elements, and the two servo signal reading elements can read two adjacent servo bands simultaneously. One or a plurality of elements for data can be disposed between the two servo signal reading elements.

In the magnetic tape apparatus, recording of data on the magnetic tape and/or reproducing of data recorded on the magnetic tape can be performed as the magnetic layer surface of the magnetic tape and the magnetic head come into contact with each other to be slid on each other. The above magnetic tape apparatus need only include the magnetic tape cartridge according to one aspect of the present invention, and well-known technologies can be applied to others.

For example, in a case where data is recorded on the magnetic recording medium on which a servo pattern is formed and/or recorded data is reproduced, first, tracking is performed using a servo signal obtained by reading the servo pattern. That is, by causing the servo signal reading element to follow a predetermined servo track, the element for data is controlled to pass over the target data track. Displacement of the data track is performed by changing a servo track to be read by the servo signal reading element in a tape width direction.

The recording and reproducing head can also perform recording and/or reproducing with respect to other data bands. In this case, the servo signal reading element need only be displaced to a predetermined servo band using the above described UDIM information to start tracking for the servo band.

EXAMPLES

Hereinafter, the present invention will be described based on Examples. Here, the present invention is not limited to aspects shown in Examples. Unless otherwise specified, "parts" and "%" in the following description indicate "parts by mass" and "mass %". eq is an equivalent and is a unit that cannot be converted into an SI unit. The processes and evaluations in the following description were performed in an environment of an atmosphere temperature of 20° C.±25° C. and a relative humidity of 40% to 60%, unless otherwise specified.

Example 1

List of each layer forming composition is shown below.
List of Magnetic Layer Forming Composition
Magnetic Liquid
Ferromagnetic powder (see Table 5): 100.0 parts
Oleic acid: 2.0 parts
Vinyl chloride copolymer (MR-104 manufactured by Kaneka Corporation): 10.0 parts
$SO_3Na$ group-containing polyurethane resin: 4.0 parts
  (weight-average molecular weight: 70,000, $SO_3Na$ group: 0.07 meq/g)
Amine-based polymer (DISPERBYK-102 manufactured by BYK-chemie): 6.0 parts
Methyl ethyl ketone: 150.0 parts
Cyclohexanone: 150.0 parts
Abrasive Liquid
α-alumina: 6.0 parts
  (Brunauer-Emmett-Teller (BET) specific surface area of 19 $m^2/g$, Mohs hardness of 9)
$SO_3Na$ group-containing polyurethane resin: 0.6 parts
  (weight-average molecular weight: 70,000, $SO_3Na$ group: 0.1 meq/g)
2,3-dihydroxynaphthalene: 0.6 parts
Cyclohexanone: 23.0 parts
Protrusion Forming Agent Liquid
Protrusion forming agent (see Table 5): 1.3 parts
Methyl ethyl ketone: 9.0 parts
Cyclohexanone: 6.0 parts
Lubricant and Curing Agent Liquid
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3.0 parts
List of Non-Magnetic Layer Forming Composition
Non-magnetic inorganic powder
α-iron oxide: 100.0 parts
  (average particle size: 10 nm, BET specific surface area: 75 $m^2/g$)
Carbon black: 25.0 parts
  (average particle size: 20 nm)
$SO_3Na$ group-containing polyurethane resin: 18.0 parts
  (weight-average molecular weight: 70,000, $SO_3Na$ group: 0.2 meq/g)
Stearic acid: see Table 5
Cyclohexanone: 300.0 parts
Methyl ethyl ketone: 300.0 parts
List of Back Coating Layer Forming Composition
Non-magnetic inorganic powder
α-iron oxide: 80.0 parts
  (average particle size: 0.15 nm, BET specific surface area: 52 $m^2/g$)
Carbon black: 20.0 parts
  (average particle size: 20 nm)
Vinyl chloride copolymer: 13.0 parts
Sulfonic acid base-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts Preparation of Magnetic Layer Forming Composition A magnetic layer forming composition was prepared by the following method.

A magnetic liquid was prepared by dispersing (bead-dispersing) various components of the magnetic liquid for 24 hours using a batch type vertical sand mill. As dispersed beads, zirconia beads having a bead diameter of 0.5 mm were used.

Various components of the above abrasive liquid were mixed and then the mixture was put in a horizontal beads mill dispersing device together with zirconia beads having a bead diameter of 0.3 mm, and a ratio of the bead volume to the total of the abrasive liquid volume and the bead volume was adjusted to be 80%, and a beads mill dispersion treatment was performed for 120 minutes. The liquid after the treatment was taken out and subjected to an ultrasonic dispersion filtration treatment using a flow type ultrasonic dispersion filtration device. Thereby, an abrasive liquid was prepared.

The various components of the above protrusion forming agent liquid were mixed and then the mixture was subjected to an ultrasonic treatment (dispersion treatment) for 60 minutes at an ultrasonic output of 500 watts per 200 cc by a horn type ultrasonic dispersing device, and the obtained dispersion liquid was filtered using a filter having a pore diameter of 0.5 μm. Thereby, a protrusion forming agent liquid was prepared.

The magnetic liquid, the abrasive liquid, the protrusion forming agent liquid, and the remaining components (lubricant and curing agent liquid) were put into a dissolver or a stirrer and stirred for 30 minutes at a circumferential speed of 10 m/sec, and subjected to a treatment of 3 passes at a flow rate of 7.5 kg/min by a flow type ultrasonic dispersing device, and then a magnetic layer forming composition was prepared by filtration through a filter having a pore diameter of 1 μm.

Preparation of Non-Magnetic Layer Forming Composition

Various components of the above non-magnetic layer forming composition were dispersed using zirconia beads having a bead diameter of 0.1 mm by a batch type vertical sand mill for 24 hours, and then filtered using a filter having a pore diameter of 0.5 μm. Thereby, the non-magnetic layer forming composition was prepared.

Preparation of Back Coating Layer Forming Composition

Components other than a lubricant (stearic acid and butyl stearate), polyisocyanate, and 200.0 parts of cyclohexanone among the various components of the above back coating layer forming composition were kneaded and diluted by an open kneader, and then subjected to a dispersion treatment of 12 passes using a horizontal beads mill dispersing device and zirconia beads having a bead diameter of 1 mm, by setting a bead filling percentage to 80 volume %, a circumferential speed of a rotor distal end to 10 m/sec, and a retention time per 1 pass to 2 minutes. After that, the remaining components were added thereto and stirred by a dissolver, and the obtained dispersion liquid was filtered using a filter having a pore diameter of 1 μm. Thereby, a back coating layer forming composition was prepared.

Manufacturing of Magnetic Tape

A magnetic tape was manufactured as shown in FIG. 1. The details are as follows.

A polyethylene naphthalate support having a thickness of 5.0 μm was sent from the sending part, and the non-magnetic layer forming composition was applied onto one surface thereof so that the thickness after drying is 0.1 μm in the first coating part, to form a coating layer. The cooling process was performed by allowing the formed coating layer to pass through the cooling zone in which the atmosphere temperature was adjusted to 0° C. for the staying time shown in Table 5 while the coating layer is in a wet state, and then the heating and drying process was performed by allowing the coating layer to pass through the first heat treatment zone (atmosphere temperature of 100° C.), to form a non-magnetic layer.

After that, the magnetic layer forming composition prepared as described above was applied onto the non-magnetic layer so that the thickness after drying is 0.1 μm in the second coating part, to form a coating layer. The vertical orientation treatment was performed in the orientation zone by applying a magnetic field having a magnetic field intensity of 0.3 T onto the surface of the coating layer of the magnetic layer forming composition in the vertical direction while the coating layer is in a wet state (undried state), and then the coating layer was dried in the second heat treatment zone (atmosphere temperature of 100° C.).

After that, in the third coating part, the back coating layer forming composition prepared as described above was applied onto the surface of the polyethylene naphthalate non-magnetic support opposite to the surface on which the non-magnetic layer and the magnetic layer are formed, so that the thickness after drying is 0.5 μm, to form a coating layer, and the formed coating layer was dried in the third heat treatment zone (atmosphere temperature of 100° C.).

After that, a calender treatment (surface smoothing treatment) was performed using a calender roll configured of only a metal roll at a speed of 80 m/min, a linear pressure of 294 kN/m (300 kg/cm), and a calender temperature (surface temperature of calender roll) of 90° C.

After that, a heat treatment was performed for 36 hours in an environment of an atmosphere temperature of 70° C. After the heat treatment, the layer was slit to have ½ inches (0.0127 meters) width to manufacture a magnetic tape.

In a state where the magnetic layer of the manufactured magnetic tape was demagnetized, a servo pattern having disposition and a shape according to the LTO Ultrium format was formed on the magnetic layer by using a servo write head mounted on a servo writer. Accordingly, a magnetic tape including a data band, a servo band, and a guide band in the disposition according to the LTO Ultrium format in the magnetic layer and including a servo pattern having the disposition and the shape according to the LTO Ultrium format on the servo band was obtained.

Accommodation of Magnetic Tape in Magnetic Tape Cartridge

As a magnetic tape cartridge accommodating the magnetic tape therein, a single reel type magnetic tape cartridge having the configuration shown in FIG. 2 was prepared. The reel hub of this magnetic tape cartridge is a single-layer reel hub (thickness: 2.5 mm, outer diameter: 44 mm) obtained by injection molding glass fiber reinforced polycarbonate. The glass fiber content of this glass fiber reinforced polycarbonate is a value shown in Table 5. A part of the glass fiber reinforced polycarbonate for injection molding was sampled, and a recommended test piece described in item 6.1.2 of JIS 7171:2016 was prepared according to item 6.3.1 (manufacturing from molding material) of JIS 7171:2016, and the flexural modulus (arithmetic average of five test pieces) was obtained according to JIS 7171:2016. In Examples and Comparative Examples described below, the flexural modulus of the reel hub material was determined by the same method.

The magnetic tape was wound around the reel hub of the magnetic tape cartridge while applying a tension of 1.0 N or less in the longitudinal direction of the tape, and the magnetic tape (tape length: 960 m) was accommodated in the magnetic tape cartridge.

Examples 2 to 22 and Comparative Examples 1 to 30

A magnetic tape was manufactured in the same manner as in Example 1 except that the various items shown in Table 5 were changed as shown in Table 5, and the manufactured magnetic tape was wound around a reel hub and accommodated in a magnetic tape cartridge.

In Comparative Example in which "not performed" is described in the row of the cooling zone staying time in Table 5, the magnetic tape was manufactured by a manufacturing process not including the cooling zone in the non-magnetic layer forming process.

Protrusion Forming Agent

A protrusion forming agent used for manufacturing magnetic tapes of Examples or Comparative Examples is as follows. A protrusion forming agent 1 and a protrusion forming agent 3 are particles having a low surface smoothness of the particle surface. A particle shape of a protrusion forming agent 2 is a cocoon shape. A particle shape of a protrusion forming agent 4 is a so-called amorphous. A particle shape of a protrusion forming agent 5 is a shape close to a true sphere.

Protrusion forming agent 1: ATLAS (composite particle of silica and polymer) manufactured by Cabot Corporation, average particle size of 100 nm Protrusion forming agent 2: TGC6020N (silica particle) manufactured by Cabot Corporation, average particle size of 140 nm Protrusion forming agent 3: Cataloid (an aqueous dispersion sol of a silica particle; as a protrusion forming agent for preparing a protrusion forming agent liquid, a dry solid obtained by heating the aqueous dispersion sol to remove a solvent is used) manufactured by JGC Catalysts Co., Ltd., average particle size of 120 nm Protrusion forming agent 4: Asahi #50 (carbon black) manufactured by Asahi Carbon Co., Ltd., average particle size of 300 nm Protrusion forming agent 5: Quartron PL-10L (an aqueous dispersion sol of a silica particle; as a protrusion forming agent for preparing a protrusion forming agent liquid, a dry solid obtained by heating the aqueous dispersion sol to remove a solvent is used) manufactured by Fuso Chemical Industry Co., Ltd., average particle size of 130 nm Ferromagnetic Powder In Table 5, "BaFe" indicates hexagonal barium ferrite powder having an average particle size (average plate diameter) of 21 nm. "SrFe1" and "SrFe2" indicate hexagonal strontium ferrite powder, and "ε-iron oxide" indicates ε-iron oxide powder.

An activation volume and an anisotropy constant Ku of various types of ferromagnetic powder described below are values obtained by the method described above using a vibrating sample magnetometer (manufactured by Toei Industry Co., Ltd.) for each ferromagnetic powder.

A mass magnetization σs is a value measured at a magnetic field intensity of 15 kOe using a vibrating sample magnetometer (manufactured by Toei Industry Co., Ltd.).

Manufacturing Method 1 of Hexagonal Strontium Ferrite Powder

"SrFe1" shown in Table 5 is hexagonal strontium ferrite powder manufactured by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the manufactured amorphous body was charged into an electric furnace, was heated to 635° C. (crystallization temperature) at a heating rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

The hexagonal strontium ferrite powder obtained above had an average particle size of 18 nm, an activation volume of 902 $nm^3$, an anisotropy constant Ku of $2.2 \times 10^5$ $J/m^3$, and a mass magnetization σs of 49 $A \cdot m^2/kg$.

12 mg of sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector

Soller slit of incident beam and diffracted beam: 0.017 radians

Fixed angle of dispersion slit: ¼ degrees

Mask: 10 mm

Anti-scattering slit: ¼ degrees

Measurement mode: continuous

Measurement time per stage: 3 seconds

Measurement speed: 0.017 degrees per second

Measurement step: 0.05 degrees

Manufacturing Method 2 of Hexagonal Strontium Ferrite Powder

"SrFe2" shown in Table 5 is hexagonal strontium ferrite powder manufactured by the following method.

1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed by a mixer to obtain a raw material mixture.

The obtained raw material mixture was dissolved in a platinum crucible at a melting temperature of 1380° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the obtained amorphous body was charged into an electric furnace, was heated to 645° C. (crystallization temperature), and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

The obtained hexagonal strontium ferrite powder had an average particle size of 19 nm, an activation volume of 1102 $nm^3$, an anisotropy constant Ku of $2.0 \times 10^5$ $J/m^3$, and a mass magnetization σs of 50 $A \cdot m^2/kg$.

Manufacturing Method of ε-Iron Oxide Powder

"ε-iron oxide" shown in Table 5 is ε-iron oxide powder manufactured by the following method.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. Powder sedimented by adding 50 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide ($\varepsilon\text{-}Ga_{0.28}Co_{0.05}Ti_{0.05}Fe_{1.62}O_3$). In addition, X-ray diffraction analysis is performed under the same condition as that described above for the manufacturing method 1 of hexagonal strontium ferrite powder, and from a peak of an X-ray diffraction pattern, it is checked that the obtained ferromagnetic powder does not include α-phase and γ-phase crystal structures, and has a single-phase and ε-phase crystal structure (ε-iron oxide type crystal structure).

The obtained ε-iron oxide powder had an average particle size of 12 nm, an activation volume of 746 $nm^3$, an anisotropy constant Ku of $1.2 \times 10^5$ $J/m^3$, and a mass magnetization σs of 16 $A \cdot m^2/kg$.

Evaluation Method (1) Storage in Accelerated Environment Equivalent to Long-Term Storage For each Example and each Comparative Example, two magnetic tape cartridges were prepared as described above, and the two magnetic tape cartridges were stored for 24 hours in an environment having an atmosphere temperature of 60° C. and a relative humidity of 80%.

(2) C—H Derived C Concentration after Storage

After storage under an accelerated environment equivalent to the long-term storage, the magnetic tape was taken out from one magnetic tape cartridge, and the inner region (length of 50 m) during winding of the magnetic tape was cut out. The cut out tape piece was used as a measurement sample, and X-ray photoelectron spectroscopic analysis was performed on the magnetic layer surface (measurement region: 300 μm×700 μm) of the measurement sample using an ESCA device, and the C—H derived C concentration was calculated from the analysis results.

Analysis and Calculation Method

The following measurements (i) to (iii) were all performed under the measurement conditions shown in Table 1.

TABLE 1

| | |
|---|---|
| Apparatus | AXIS-ULTRA manufactured by SHIMADZU Corporation |
| Excitation X-ray source | Monochromatic Al-Kα ray (output: 15 kV, 20 mA) |
| Analyzer mode | Spectrum |
| Lens mode | Hybrid (analysis area: 300 μm × 700 μm) |
| Neutralization electron gun for charge correction (Charge neutralizer) | ON (used) |
| Photoelectron take-off angle (take-off angle) | 10 degree (angle formed by detector and sample surface) |

(i) Wide Scan Measurement

Wide scan measurement (measurement conditions: see Table 2) was performed on the magnetic layer surface of the magnetic tape by an ESCA device, and the types of detected elements were examined (qualitative analysis).

TABLE 2

| Scan range | Pass energy | Energy resolution (Step) | Dwell time (Dwell) | Number of integration times (Sweeps) |
|---|---|---|---|---|
| 0 to 1200 eV | 160 eV | 1 eV/step | 100 ms/step | 5 |

(ii) Narrow Scan Measurement

Narrow scan measurement (measurement conditions: see Table 3) was performed on all the elements detected in (i) above. An atomic concentration (unit: at %) of each element detected from the peak area of each element was calculated using data processing software (Vision 2.2.6) attached to the device. Here, the C concentration was also calculated.

TABLE 3

| Spectra[Note 1] | Scan range | Pass energy | Energy resolution (Step) | Dwell time (Dwell) | Number of integration times (Sweeps)[Note 2] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

[Note 1] Spectra (element species) shown in Table 3 are examples, and in a case where element not shown in Table 3 is detected by qualitative analysis of (i), the same narrow scan measurement is performed in scan range including entirety of spectra of detected elements.
[Note 2] Spectra with favorable signal-to-noise-ratio (SNR) were measured three times of integration. However, even in a case where the number of integration times regarding entirety of spectra is set as five times, quantitative results are not affected.

(iii) Acquisition of C1s Spectra

C1s spectra were acquired under the measurement conditions shown in Table 4. For the acquired C1s spectra, a shift (physical shift) caused by charging of a sample was corrected using data processing software (Vision 2.2.6) attached to the device, and then fitting (peak separation) of the C1s spectra was performed using the software. For the peak separation, a Gauss-Lorentz complex function (Gaussian component: 70%, Lorentz component: 30%) was used, and the C1s spectra were fitted by a nonlinear least-squares method to calculate a proportion (peak area ratio) of the C—H peak in the C1s spectra. A C—H derived C concentration was calculated by multiplying the calculated C—H peak area ratio by the C concentration obtained in (ii) above.

TABLE 4

| Spectra | Scan range | Pass energy | Energy resolution (Step) | Dwell time (Dwell) | Number of integration times (Sweeps) |
|---|---|---|---|---|---|
| C1s | 276 to 296 eV | 10 eV | 0.1 eV/step | 200 ms/step | 20 |

The above treatment was performed three times at different positions on the magnetic layer surface of the measurement sample, and an arithmetic average of the obtained values was defined as the C—H derived C concentration.

(3) Evaluation of Running Stability after Storage Under Accelerated Environment Equivalent to Long-Term Storage After storage under an accelerated environment equivalent to the long-term storage of (1) above, the magnetic tape was taken out from another magnetic tape cartridge, and a tape piece (a piece of tape having a length of 10 m from a position of 40 m to a position of 50 m from the tape inner end) having a length of 10 m was cut out from the inner region during winding of the magnetic tape. The cut out tape piece was used as a sample for evaluating running stability, and a position error signal (PES) was obtained by the following method.

The servo pattern was read by a verify head on the servo writer used for forming the servo pattern. The verify head is a reading magnetic head used for confirming the quality of the servo pattern formed on the magnetic tape, and a reading element is disposed at a position corresponding to the position (position of the magnetic tape in the width direction) of the servo pattern, in the same manner as the magnetic head of a well-known magnetic tape apparatus (drive).

A well-known PES arithmetic circuit that calculates the head positioning accuracy of the servo system as the PES from an electric signal obtained by reading the servo pattern by the verify head is connected to the verify head. The PES arithmetic circuit calculated a displacement from the input electric signal (pulse signal) in the width direction of the magnetic tape, as required, and a value obtained by applying a high pass filter (cutoff: 500 cycles/m) with respect to temporal change information (signal) of the displacement was calculated as PES. The PES can be used as an index for running stability, and in a case where the PES calculated above is 13 nm or less, it can be evaluated that excellent running stability was obtained on the cartridge core side even after storage under an accelerated environment equivalent to long-term storage.

The above results are shown in Table 5 (Tables 5-1 to 5-5).

TABLE 5-1

| | | | Unit | Example 1 | Example 2 | Example 3 | Example 4 | Example 5 |
|---|---|---|---|---|---|---|---|---|
| Magnetic layer | Ferromagnetic powder | Type | — | BaFe | BaFe | BaFe | BaFe | BaFe |
| | Protrusion forming agent | Type | — | Protrusion forming agent 1 | Protrusion forming agent 1 | Protrusion forming agent 1 | Protrusion forming agent 1 | Protrusion forming agent 1 |
| Non-magnetic layer | Stearic acid | Content | Parts | 2.0 | 2.0 | 2.0 | 2.0 | 6.0 |

TABLE 5-1-continued

| | | | | | | | | |
|---|---|---|---|---|---|---|---|---|
| Manufacturing conditions | Cooling zone staying time | | | 1 second | 5 seconds | 50 seconds | 180 seconds | 1 second |
| Reel hub material | Flexural modulus | | GPa | 5 | 5 | 5 | 5 | 5 |
| | Glass fiber content | | | 15% | 15% | 15% | 15% | 15% |
| Physical properties | C-H derived C concentration after storage | | | 45 at % | 55 at % | 65 at % | 70 at % | 48 at % |
| Performance | PES | | nm | 13 | 10 | 7 | 5 | 12 |

| | | | Unit | Example 6 | Example 7 | Example 8 | Example 9 | Example 10 |
|---|---|---|---|---|---|---|---|---|
| Magnetic layer | Ferromagnetic powder | Type | — | BaFe | BaFe | BaFe | BaFe | BaFe |
| | Protrusion forming agent | Type | — | Protrusion forming agent 2 | Protrusion forming agent 2 | Protrusion forming agent 2 | Protrusion forming agent 2 | Protrusion forming agent 2 |
| Non-magnetic layer | Stearic acid | Content | Parts | 2.0 | 2.0 | 2.0 | 2.0 | 6.0 |
| Manufacturing conditions | Cooling zone staying time | | | 1 second | 5 seconds | 50 seconds | 180 seconds | 1 second |
| Reel hub material | Flexural modulus | | GPa | 5 | 5 | 5 | 5 | 5 |
| | Glass fiber content | | | 15% | 15% | 15% | 15% | 15% |
| Physical properties | C-H derived C concentration after storage | | | 45 at % | 55 at % | 65 at % | 70 at % | 48 at % |
| Performance | PES | | nm | 12 | 10 | 7 | 5 | 10 |

TABLE 5-2

| | | | Unit | Example 11 | Example 12 | Example 13 | Example 14 | Example 15 | Example 16 |
|---|---|---|---|---|---|---|---|---|---|
| Magnetic layer | Ferromagnetic powder | Type | — | BaFe | BaFe | BaFe | BaFe | BaFe | BaFe |
| | Protrusion forming agent | Type | — | Protrusion forming agent 3 | Protrusion forming agent 3 | Protrusion forming agent 3 | Protrusion forming agent 3 | Protrusion forming agent 3 | Protrusion forming agent 1 |
| Non-magnetic layer | Stearic acid | Content | Parts | 2.0 | 2.0 | 2.0 | 2.0 | 6.0 | 2.0 |
| Manufacturing conditions | Cooling zone staying time | | | 1 second | 5 seconds | 50 seconds | 180 seconds | 1 second | 1 second |
| Reel hub material | Flexural modulus | | GPa | 5 | 5 | 5 | 5 | 5 | 6 |
| | Glass fiber content | | | 15% | 15% | 15% | 15% | 15% | 20% |
| Physical properties | C-H derived C concentration after storage | | | 45 at % | 55 at % | 65 at % | 70 at % | 48 at % | 45 at % |
| Performance | PES | | nm | 12 | 9 | 8 | 5 | 10 | 10 |

| | | | Unit | Example 17 | Example 18 | Example 19 | Example 20 | Example 21 | Example 22 |
|---|---|---|---|---|---|---|---|---|---|
| Magnetic layer | Ferromagnetic powder | Type | — | BaFe | BaFe | BaFe | SrFe1 | SrFe2 | ε-iron oxide |
| | Protrusion forming agent | Type | — | Protrusion forming agent 1 | Protrusion forming agent 1 | Protrusion forming agent 1 | Protrusion forming agent 1 | Protrusion forming agent 1 | Protrusion forming agent 1 |
| Non-magnetic layer | Stearic acid | Content | Parts | 2.0 | 2.0 | 2.0 | 2.0 | 2.0 | 2.0 |
| Manufacturing conditions | Cooling zone staying time | | | 1 second | 50 seconds | 180 seconds | 1 second | 1 second | 1 second |
| Reel hub material | Flexural modulus | | GPa | 8 | 8 | 8 | 5 | 5 | 5 |
| | Glass fiber content | | | 30% | 30% | 30% | 15% | 15% | 15% |
| Physical properties | C-H derived C concentration after storage | | | 45 at % | 65 at % | 70 at % | 45 at % | 45 at % | 45 at % |
| Performance | PES | | nm | 5 | 3 | 2 | 12 | 12 | 12 |

TABLE 5-3

| | | | Unit | Comparative Example 1 | Comparative Example 2 | Comparative Example 3 | Comparative Example 4 | Comparative Example 5 |
|---|---|---|---|---|---|---|---|---|
| Magnetic layer | Ferromagnetic powder | Type | — | BaFe | BaFe | BaFe | BaFe | BaFe |
| | Protrusion | Type | | Protrusion | Protrusion | Protrusion | Protrusion | Protrusion |

TABLE 5-3-continued

|  |  |  |  |  |  |  |  |  |
|---|---|---|---|---|---|---|---|---|
|  | forming agent |  |  | forming agent 4 | forming agent 5 | forming agent 1 | forming agent 2 | forming agent 3 |
| Non-magnetic layer | Stearic acid | Content | Parts | 2.0 | 2.0 | 2.0 | 2.0 | 2.0 |
| Manufacturing conditions | Cooling zone staying time |  |  | Not performed | Not performed | Not performed | Not performed | Not performed |
| Reel hub material | Flexural modulus | | GPa | 3 | 3 | 3 | 3 | 3 |
|  | Glass fiber content | | | 10% | 10% | 10% | 10% | 10% |
| Physical properties | C-H derived C concentration after storage | | | 35 at % | 35 at % | 35 at % | 35 at % | 35 at % |
| Performance | PES | | nm | 40 | 40 | 30 | 30 | 30 |

|  |  |  | Unit | Comparative Example 6 | Comparative Example 7 | Comparative Example 8 | Comparative Example 9 | Comparative Example 10 |
|---|---|---|---|---|---|---|---|---|
| Magnetic layer | Ferromagnetic powder | Type | — | BaFe | BaFe | BaFe | BaFe | BaFe |
|  | Protrusion forming agent | Type | — | Protrusion forming agent 4 | Protrusion forming agent 4 | Protrusion forming agent 5 | Protrusion forming agent 5 | Protrusion forming agent 1 |
| Non-magnetic layer | Stearic acid | Content | Parts | 4.0 | 6.0 | 4.0 | 6.0 | 4.0 |
| Manufacturing conditions | Cooling zone staying time |  |  | Not performed | Not performed | Not performed | Not performed | Not performed |
| Reel hub material | Flexural modulus | | GPa | 3 | 3 | 3 | 3 | 3 |
|  | Glass fiber content | | | 10% | 10% | 10% | 10% | 10% |
| Physical properties | C-H derived C concentration after storage | | | 35 at % | 38 at % | 35 at % | 38 at % | 35 at % |
| Performance | PES | | nm | 40 | 40 | 40 | 40 | 28 |

TABLE 5-4

|  |  |  | Unit | Comparative Example 11 | Comparative Example 12 | Comparative Example 13 | Comparative Example 14 | Comparative Example 15 |
|---|---|---|---|---|---|---|---|---|
| Magnetic layer | Ferromagnetic powder | Type | — | BaFe | BaFe | BaFe | BaFe | BaFe |
|  | Protrusion forming agent | Type | — | Protrusion forming agent 1 | Protrusion forming agent 2 | Protrusion forming agent 2 | Protrusion forming agent 3 | Protrusion forming agent 3 |
| Non-magnetic layer | Stearic acid | Content | Parts | 6.0 | 4.0 | 6.0 | 4.0 | 6.0 |
| Manufacturing conditions | Cooling zone staying time |  |  | Not performed | Not performed | Not performed | Not performed | Not performed |
| Reel hub material | Flexural modulus | | GPa | 3 | 3 | 3 | 3 | 3 |
|  | Glass fiber content | | | 10% | 10% | 10% | 10% | 10% |
| Physical properties | C-H derived C concentration after storage | | | 38 at % | 35 at % | 38 at % | 35 at % | 38 at % |
| Performance | PES | | nm | 28 | 30 | 28 | 30 | 29 |

|  |  |  | Unit | Comparative Example 16 | Comparative Example 17 | Comparative Example 18 | Comparative Example 19 | Comparative Example 20 |
|---|---|---|---|---|---|---|---|---|
| Magnetic layer | Ferromagnetic powder | Type | — | BaFe | BaFe | BaFe | BaFe | BaFe |
|  | Protrusion forming agent | Type | — | Protrusion forming agent 4 | Protrusion forming agent 4 | Protrusion forming agent 4 | Protrusion forming agent 4 | Protrusion forming agent 5 |
| Non-magnetic layer | Stearic acid | Content | Parts | 2.0 | 2.0 | 2.0 | 2.0 | 2.0 |
| Manufacturing conditions | Cooling zone staying time |  |  | 1 second | 5 seconds | 50 seconds | 180 seconds | 1 second |
| Reel hub material | Flexural modulus | | GPa | 3 | 3 | 3 | 3 | 3 |
|  | Glass fiber content | | | 10% | 10% | 10% | 10% | 10% |
| Physical properties | C-H derived C concentration after storage | | | 40 at % | 41 at % | 42 at % | 42 at % | 40 at % |
| Performance | PES | | nm | 25 | 25 | 25 | 23 | 25 |

TABLE 5-5

|  |  | Unit | Comparative Example 21 | Comparative Example 22 | Comparative Example 23 | Comparative Example 24 | Comparative Example 25 |
|---|---|---|---|---|---|---|---|
| Magnetic layer | Ferromagnetic powder Type | — | BaFe | BaFe | BaFe | BaFe | BaFe |
|  | Protrusion forming agent Type | — | Protrusion forming agent 5 | Protrusion forming agent 5 | Protrusion forming agent 5 | Protrusion forming agent 4 | Protrusion forming agent 5 |
| Non-magnetic layer | Stearic acid Content | Parts | 2.0 | 2.0 | 2.0 | 2.0 | 2.0 |
| Manufacturing conditions | Cooling zone staying time |  | 5 seconds | 50 seconds | 180 seconds | Not performed | Not performed |
| Reel hub material | Flexural modulus | GPa | 3 | 3 | 3 | 8 | 8 |
|  | Glass fiber content |  | 10% | 10% | 10% | 30% | 30% |
| Physical properties | C-H derived C concentration after storage |  | 41 at % | 42 at % | 42 at % | 40 at % | 40 at % |
| Performance | PES | nm | 25 | 23 | 23 | 30 | 30 |

|  |  | Unit | Comparative Example 26 | Comparative Example 27 | Comparative Example 28 | Comparative Example 29 | Comparative Example 30 |
|---|---|---|---|---|---|---|---|
| Magnetic layer | Ferromagnetic powder Type | — | BaFe | BaFe | BaFe | BaFe | BaFe |
|  | Protrusion forming agent Type | — | Protrusion forming agent 1 | Protrusion forming agent 2 | Protrusion forming agent 3 | Protrusion forming agent 4 | Protrusion forming agent 5 |
| Non-magnetic layer | Stearic acid Content | Parts | 2.0 | 2.0 | 2.0 | 2.0 | 2.0 |
| Manufacturing conditions | Cooling zone staying time |  | Not performed | Not performed | Not performed | 1 second | 1 second |
| Reel hub material | Flexural modulus | GPa | 8 | 8 | 8 | 8 | 8 |
|  | Glass fiber content |  | 30% | 30% | 30% | 30% | 30% |
| Physical properties | C-H derived C concentration after storage |  | 42 at % | 42 at % | 42 at % | 42 at % | 42 at % |
| Performance | PES | nm | 20 | 20 | 20 | 20 | 20 |

From the results shown in Table 5, it can be confirmed that the magnetic tape accommodated in the magnetic tape cartridge of Examples and stored in an accelerated test environment equivalent to long-term storage has excellent running stability on the cartridge core side after such storage, that is, in a state equivalent to a state after long-term storage. With such a magnetic tape, even after information with a low access frequency is recorded and then accommodated in the magnetic tape cartridge in a state of being wound around the reel hub for a long period of time, the magnetic tape can stably run in the magnetic tape apparatus on the cartridge core side and is suitable as a recording medium for archiving.

One aspect of the present invention is effective in data storage applications.

What is claimed is:

1. A magnetic tape cartridge comprising:
   a magnetic tape that is accommodated in the magnetic tape cartridge while being wound around a reel hub,
   wherein the magnetic tape
   has a non-magnetic support and a magnetic layer including ferromagnetic powder, and
   includes one or more components selected from the group consisting of a fatty acid and a fatty acid amide in a portion on the magnetic layer side on the non-magnetic support, and
   after the magnetic tape cartridge is stored in an environment of an atmosphere temperature of 60° C. and a relative humidity of 80% for 24 hours, a C—H derived C concentration calculated from a C—H peak area ratio of C1s spectra obtained by X-ray photoelectron spectroscopic analysis performed at a photoelectron take-off angle of 10 degrees on a surface of the magnetic layer in an inner region during winding of the magnetic tape is 45 at % or more.
2. The magnetic tape cartridge according to claim 1, wherein the C—H derived C concentration is 45 at % or more and 80 at % or less.
3. The magnetic tape cartridge according to claim 1, wherein the magnetic layer includes an inorganic oxide-based particle.
4. The magnetic tape cartridge according to claim 3, wherein the inorganic oxide-based particle is a composite particle of an inorganic oxide and a polymer.
5. The magnetic tape cartridge according to claim 1, wherein a material constituting at least an outer peripheral surface layer portion of the reel hub has a flexural modulus of 5 GPa or more.
6. The magnetic tape cartridge according to claim 5, wherein the flexural modulus is 8 GPa or more.
7. The magnetic tape cartridge according to claim 1, wherein the magnetic tape has a non-magnetic layer including non-magnetic powder between the non-magnetic support and the magnetic layer.
8. The magnetic tape cartridge according to claim 1, wherein the magnetic tape has a back coating layer including non-magnetic powder on a surface side of the non-magnetic support opposite to a surface side provided with the magnetic layer.
9. The magnetic tape cartridge according to claim 1, wherein the ferromagnetic powder is hexagonal barium ferrite powder.
10. The magnetic tape cartridge according to claim 1, wherein the ferromagnetic powder is hexagonal strontium ferrite powder.

11. The magnetic tape cartridge according to claim 1, wherein the ferromagnetic powder is ε-iron oxide powder.

12. A magnetic tape apparatus comprising:
the magnetic tape cartridge according to claim 1.

13. The magnetic tape apparatus according to claim 12, wherein the C—H derived C concentration is 45 at % or more and 80 at % or less.

14. The magnetic tape apparatus according to claim 12, wherein the magnetic layer includes an inorganic oxide-based particle.

15. The magnetic tape apparatus according to claim 14, wherein the inorganic oxide-based particle is a composite particle of an inorganic oxide and a polymer.

16. The magnetic tape apparatus according to claim 12, wherein a material constituting at least an outer peripheral surface layer portion of the reel hub has a flexural modulus of 5 GPa or more.

17. The magnetic tape apparatus according to claim 16, wherein the flexural modulus is 8 GPa or more.

18. The magnetic tape apparatus according to claim 12, wherein the magnetic tape has a non-magnetic layer including non-magnetic powder between the non-magnetic support and the magnetic layer.

19. The magnetic tape apparatus according to claim 12, wherein the magnetic tape has a back coating layer including non-magnetic powder on a surface side of the non-magnetic support opposite to a surface side provided with the magnetic layer.

\* \* \* \* \*